United States Patent
Matsui et al.

(10) Patent No.: US 8,915,730 B2
(45) Date of Patent: Dec. 23, 2014

(54) THREE-DIMENSIONAL MODELING APPARATUS, METHOD OF PRODUCING A THREE-DIMENSIONAL OBJECT, AND THREE-DIMENSIONAL OBJECT

(75) Inventors: Takeshi Matsui, Tokyo (JP); Yasuhiro Tanaka, Kanagawa (JP); Junichi Kuzusako, Saitama (JP); Ikuko Tsurui, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/868,278

(22) Filed: Aug. 25, 2010

(65) Prior Publication Data

US 2011/0054663 A1 Mar. 3, 2011

(30) Foreign Application Priority Data

Sep. 2, 2009 (JP) ................................ 2009-202406

(51) Int. Cl.
 *B29C 35/04* (2006.01)
 *B29C 67/00* (2006.01)
 *B29L 31/00* (2006.01)

(52) U.S. Cl.
 CPC ....... *B29C 67/0059* (2013.01); *B29L 2031/753* (2013.01)
 USPC ........... 425/375; 425/447; 425/448; 425/449; 425/174.4; 264/401; 264/494; 264/497

(58) Field of Classification Search
 USPC ...................... 425/174.4, 375, 447, 448, 449; 264/497, 401, 494
 See application file for complete search history.

(56) References Cited

U.S. PATENT DOCUMENTS

| | | | |
|---|---|---|---|
| 5,252,264 A * | 10/1993 | Forderhase et al. | 425/174.4 |
| 5,740,051 A | 4/1998 | Sanders, Jr. et al. | |
| 5,807,437 A | 9/1998 | Sachs et al. | |
| 6,259,962 B1 | 7/2001 | Gothait | |
| 2004/0254668 A1 * | 12/2004 | Jang et al. | 700/119 |
| 2009/0020919 A1 * | 1/2009 | Marsac | 264/401 |

FOREIGN PATENT DOCUMENTS

| | | |
|---|---|---|
| EP | 1712343 | 10/2006 |
| JP | 2002-018967 | 1/2002 |
| JP | 2003-535712 | 12/2003 |
| WO | 03/079985 | 10/2003 |
| WO | 2004/062930 | 7/2004 |

OTHER PUBLICATIONS

European Search Report corresponding to European Serial No. 10008201.5 dated Dec. 21, 2010.

* cited by examiner

Primary Examiner — Timothy Kennedy
(74) Attorney, Agent, or Firm — Dentons US LLP

(57) ABSTRACT

A three-dimensional modeling apparatus includes a stage, a head, a movement mechanism, and a control unit. The head supplies a process liquid that is one of a solution and a dispersion liquid onto the stage to cause a material that constitutes a three-dimensional object to be precipitated out of the process liquid by evaporating one of a solvent and a dispersion medium therefrom. The movement mechanism relatively moves the head and the stage. The control unit controls a drive of the movement mechanism to form the three-dimensional object.

18 Claims, 21 Drawing Sheets

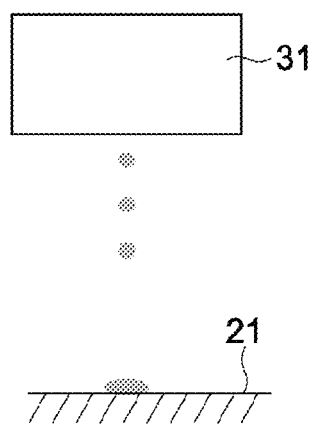
FIG.10A
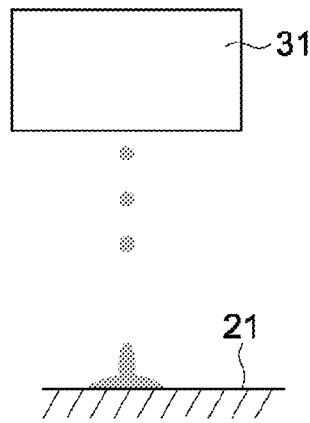
FIG.10B
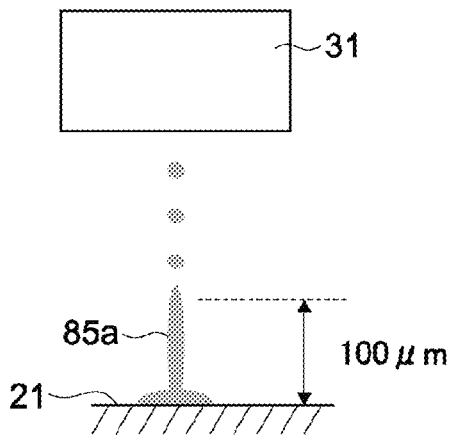
FIG.10C
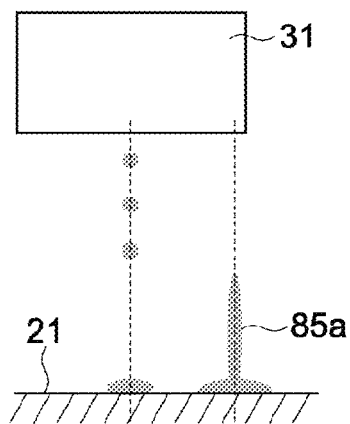
FIG.10D 100μm
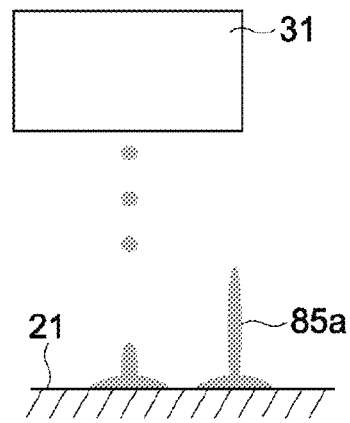
FIG.10E
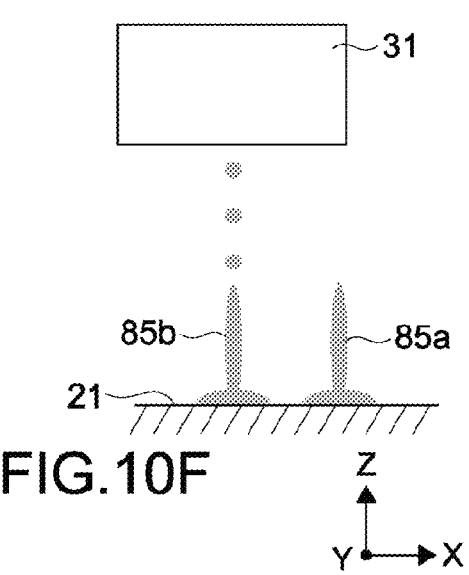
FIG.10F

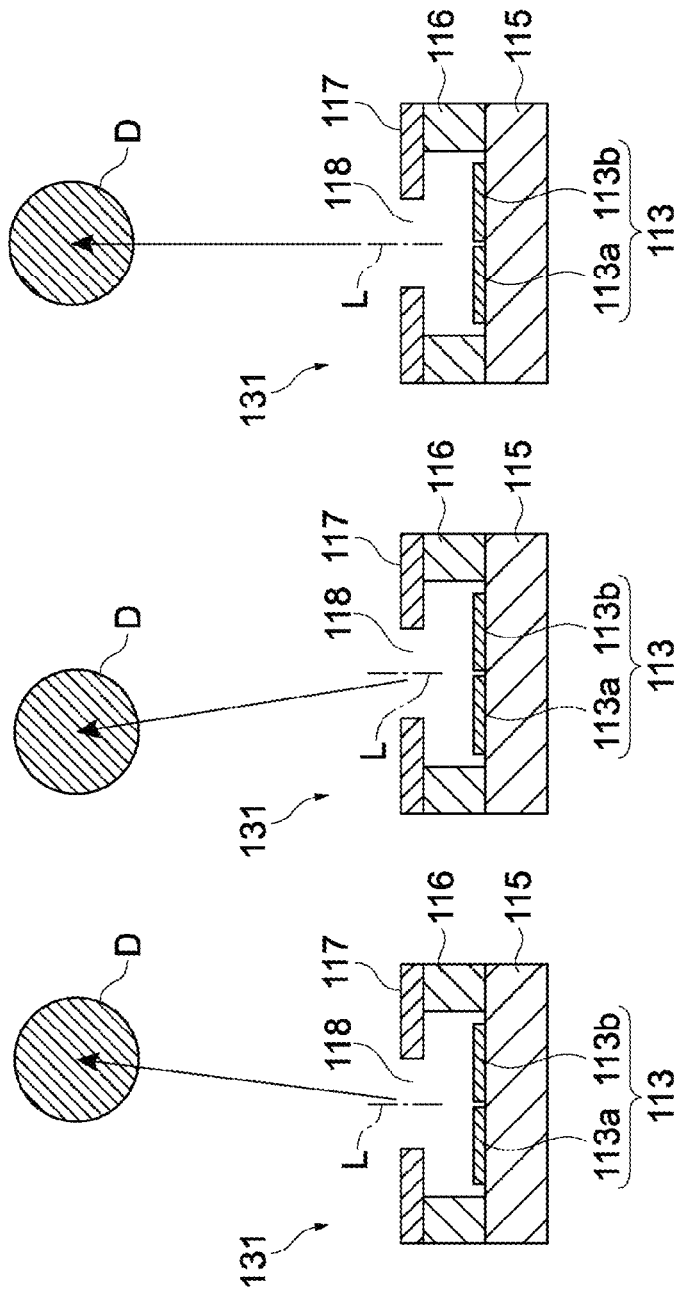

THREE-DIMENSIONAL MODELING APPARATUS, METHOD OF PRODUCING A THREE-DIMENSIONAL OBJECT, AND THREE-DIMENSIONAL OBJECT

BACKGROUND OF THE INVENTION

1. Field of the Invention

The present invention relates to a three-dimensional modeling apparatus that forms a three-dimensional object, a method of producing a three-dimensional object, and a three-dimensional object.

2. Description of the Related Art

In the past, a three-dimensional modeling apparatus has been known as an apparatus of rapid prototyping, which is widespread for commercial use. As main methods for the three-dimensional modeling apparatus, stereo lithography, laminated object manufacturing, modeling with powders, and direct modeling are used, for example.

In the direct modeling, for example, an inkjet technique is used. A light curing resin or a thermoplastic resin is directly discharged with an inkjet head into a desired shape while the discharged resin is irradiated with UV light or heat, thereby producing a three-dimensional object.

As an example of the direct modeling, Japanese Patent Translation Publication No. 2003-535712 (hereinafter, referred to as Patent Document 1) discloses a three-dimensional printing apparatus including a printing head and a curing apparatus. The printing head includes a plurality of nozzles from which a light curing resin material is discharged. The curing apparatus emits UV light or IR light for curing the material (see, for example paragraph 0025 of Patent Document 1).

As another example of the direct modeling Japanese Patent Application Laid-open No. 2002-18967 (hereinafter, referred to as Patent Document 2) discloses a target object producing apparatus including a material injection head portion, a phase transformation facilitation head portion, and a parallel link mechanism. The material injection head portion injects a material such as a light curing resin. The phase transformation facilitation head portion outputs a curing acceleration factor such as laser light. The parallel link mechanism supports those head portions. By the parallel link mechanism, the light curing resin material is injected from an arbitrary direction, and the material is irradiated with the laser light from the arbitrary direction (see, for example, paragraphs 0036 and 0038 of Patent Document 2).

SUMMARY OF THE INVENTION

In the direct modeling in which a light curing resin is used, a UV curing resin is used in most cases. Since limited UV curing resins can be used, a heavy burden is placed on the environment. Further, the entire resin to be modeled has to be irradiated with UV light, which requires an installation site of a UV irradiation apparatus. For this reason, reduction in size of the entire apparatus is difficult.

In view of the above-mentioned circumstances, it is desirable to provide a three-dimensional modeling apparatus and a method of producing a three-dimensional object capable of being reduced in size while expanding a range of options of materials, and to provide a three-dimensional object obtained by the three-dimensional modeling apparatus and the method of producing the three-dimensional object.

According to an embodiment of the present invention, there is provided a three-dimensional modeling apparatus including a stage, a head, a movement mechanism, and a control means.

The head supplies a process liquid that is one of a solution and a dispersion liquid onto the stage to cause a material that constitutes a three-dimensional object to be precipitated out of the process liquid by evaporating one of a solvent and a dispersion medium therefrom.

The movement mechanism relatively moves the head and the stage.

The control means controls a drive of the movement mechanism to form the three-dimensional object.

Since the 3-D object is formed by evaporating the solvent or the dispersion medium and the material is precipitated, it is unnecessary to use a UV curing resin and installing a UV irradiation apparatus or the like. Therefore, the range of options of the material can be expanded, and the reduction in size of the three-dimensional modeling apparatus can be realized. In addition, UV light is not used, with the result that security can be improved.

The control means may form at least two vertical rod-like bodies with the material and form a non-vertical rod-like body with the material. The non-vertical rod-like body connects the two vertical rod-like bodies. The solvent or the dispersion medium spontaneously evaporates to precipitate and solidify the material. Therefore, the non-vertical rod-like body can be bridged between the two vertical rod-like bodies.

The three-dimensional object may be a lattice-shaped object or a porous body. Thus, it is possible to provide a scaffolding member that is used for regeneration of a body tissue in a field of regenerative medicine or the like.

The control means may form the non-vertical rod-like body by moving the head and the stage relatively in a non-vertical direction.

The head is capable of discharging the process liquid in an oblique direction. With this structure, a part of the three-dimensional object (for example, non-vertical rod-like body) that is elongated in a non-vertical direction can be formed without using the movement mechanism.

The control means may control movement of the movement mechanism based on two-dimensional image data that is a tomographic image of a modeling target object.

According to another embodiment of the present invention, there is provided a method of producing a three-dimensional object including relatively moving a stage and a head.

A process liquid that is one of a solution and a dispersion liquid is discharged onto the stage from the head.

A relative position of the stage and the head is controlled to form a three-dimensional object by evaporating one of a solvent and a dispersion medium from the process liquid and causing a material to be precipitated.

According to another embodiment of the present invention, there is provided a three-dimensional object obtained by the above-mentioned method of producing a three-dimensional object.

As described above, according to the embodiments of the present invention, the range of options of the material can be expanded, and the reduction in size of the three-dimensional modeling apparatus can be realized.

These and other objects, features and advantages of the present invention will become more apparent in light of the following detailed description of best mode embodiments thereof, as illustrated in the accompanying drawings.

BRIEF DESCRIPTION OF DRAWINGS

FIG. 10 are diagrams showing a method of producing a lattice-shaped 3-D object;

FIG. 20 are diagrams for explaining states where a discharge direction of ink is deflected;

DESCRIPTION OF PREFERRED EMBODIMENTS

Hereinafter, embodiments of the present invention will be described with reference to the drawings.

(Structure of Three-Dimensional Modeling Apparatus)

Figure 1:
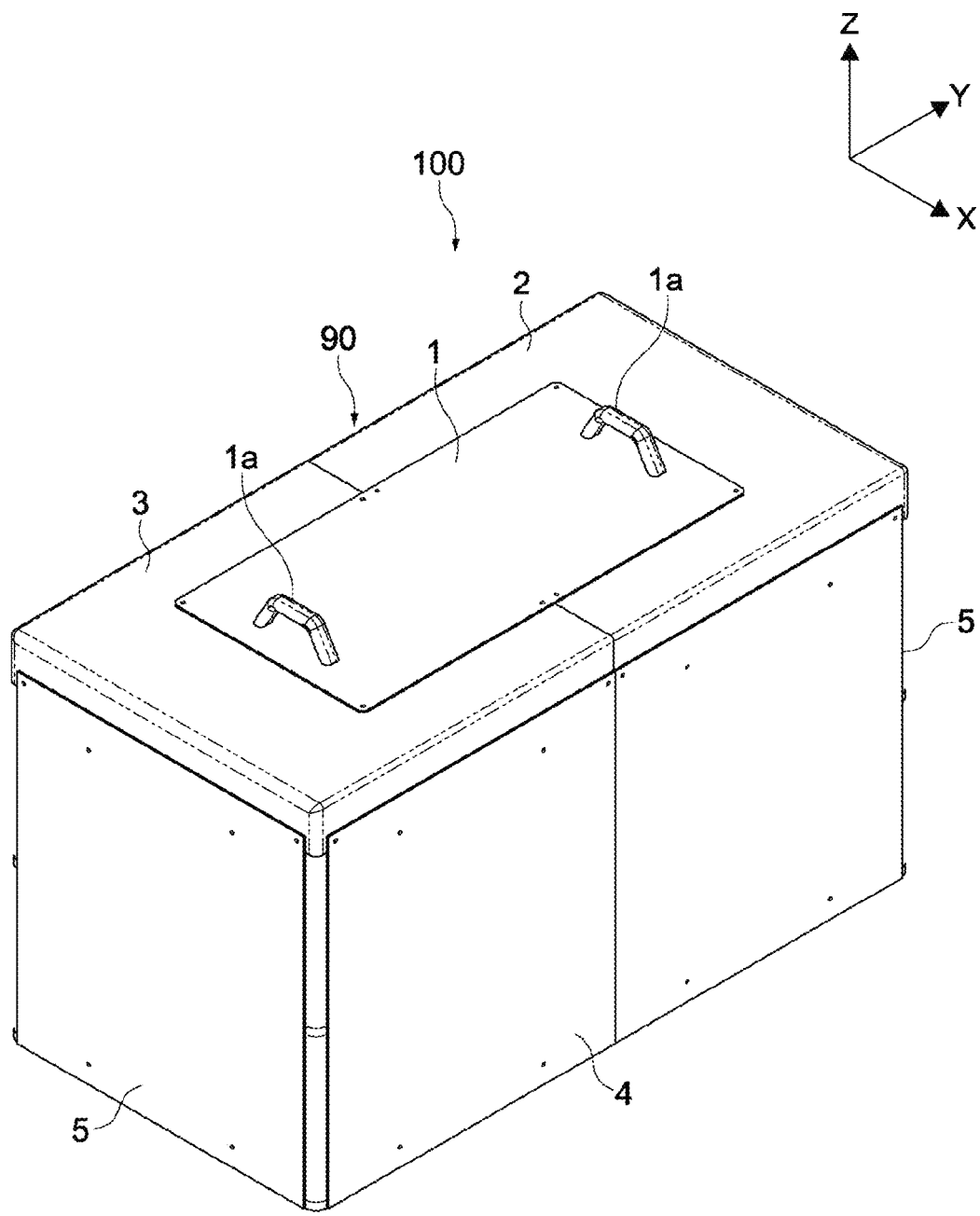
FIG. 1 is a perspective view showing an appearance of a three-dimensional (3-D) modeling apparatus according to an embodiment of the present invention.

FIG. 1 is a perspective view showing an appearance of a three-dimensional (3-D) modeling apparatus 100 according to an embodiment of the present invention.

The 3-D modeling apparatus 100 includes a casing 90 whose shape is an approximately rectangular parallelepiped. The casing 90 is constituted of a plurality of covers. Specifically, an upper portion of the casing 90 is formed of a top cover 1 and right and left covers 2 and 3 between which the top cover 1 is sandwiched from both sides thereof. Further, the casing 90 of the 3-D modeling apparatus 100 includes a front cover 4, side covers 5 on both side surfaces, and a back cover (not shown). The top cover 1 is provided with a handle 1a, with which the top cover 1 can be detached from the right cover 2 and the left cover 3. It should be noted that a control circuit box is connected on the back side of the casing 90. In the control circuit box, a control circuit for controlling respective portions of the 3-D modeling apparatus 100 is incorporated as described later.

Figure 2A:
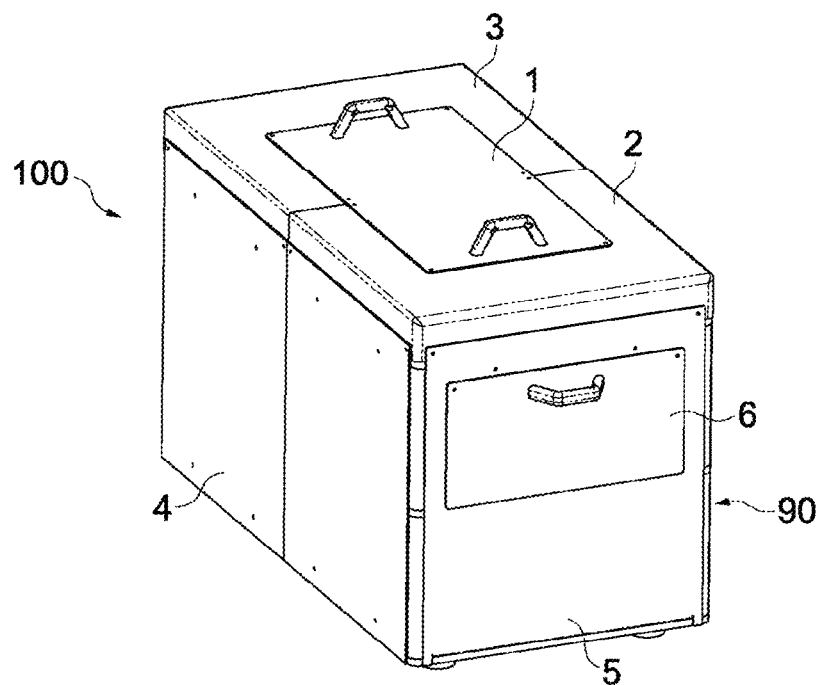
FIG. 2 are perspective views viewed from sides of the 3-D modeling apparatus.
Figure 2B:
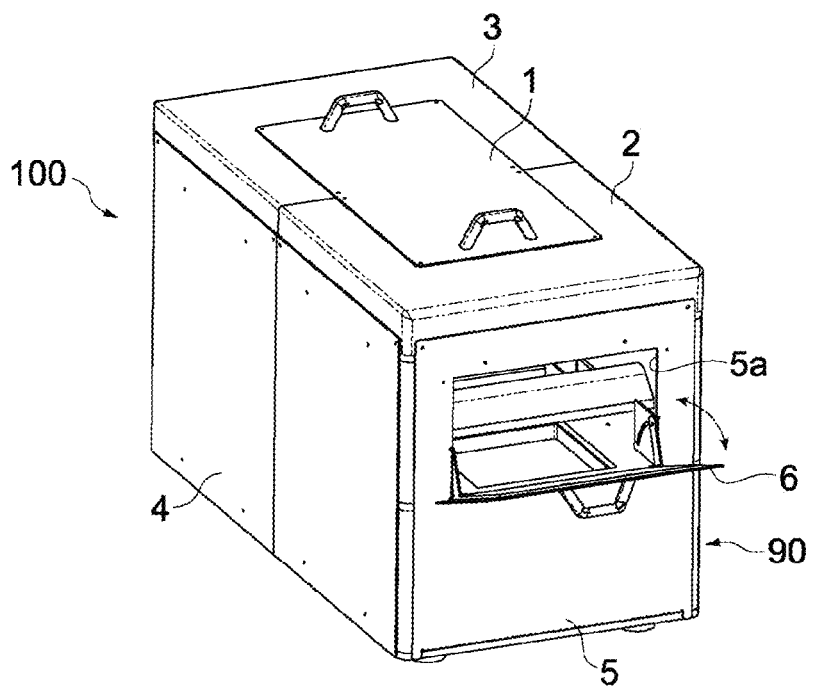

FIGS. 2A and 2B are perspective views viewed from the sides of the 3-D modeling apparatus 100. As shown in FIG. 2B, on one of the side covers 5, a takeout opening 5a for taking a created 3-D object out, and a takeout opening cover 6 is provided to the takeout opening 5a so as to be opened and closed.

Figure 3:
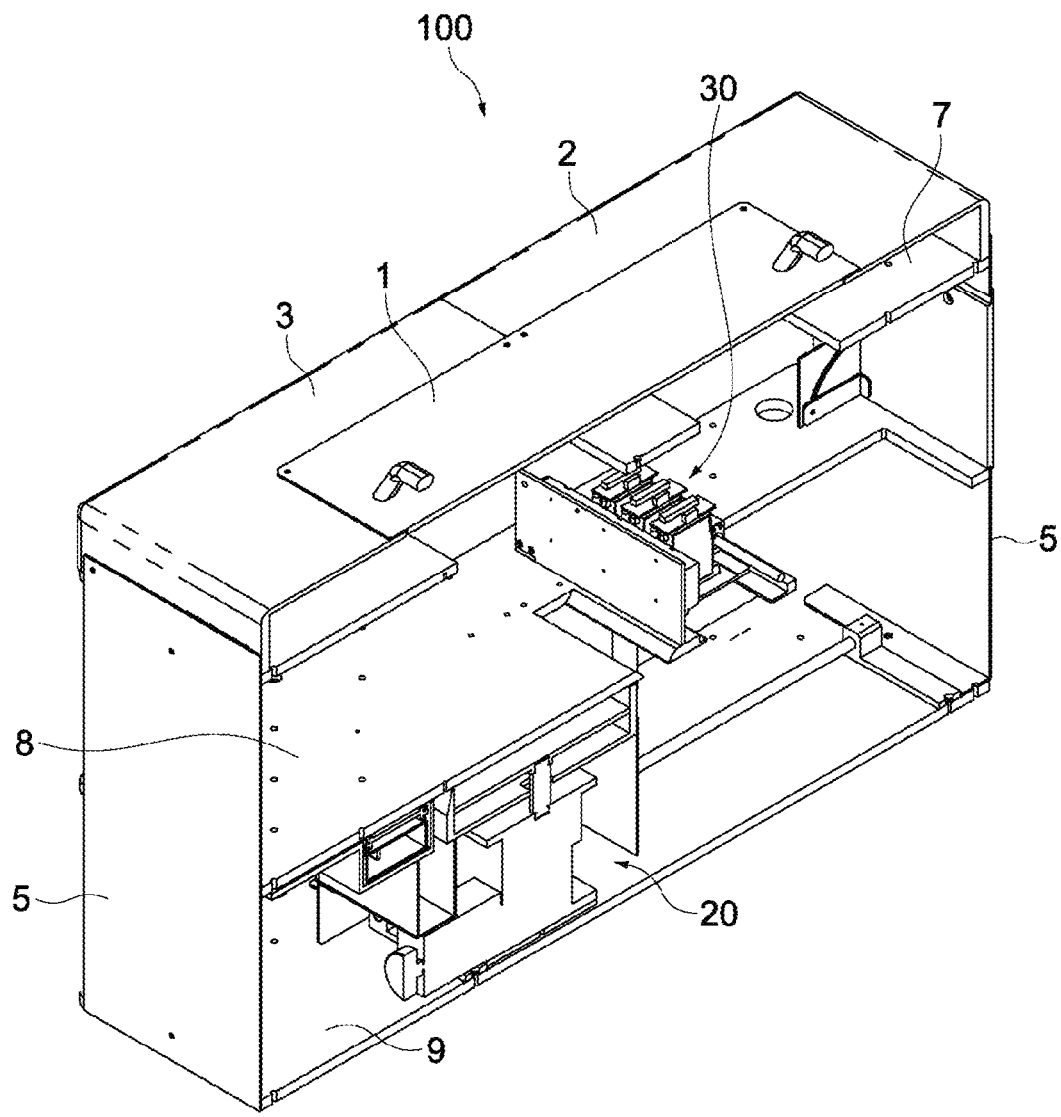
FIG. 3 is a perspective view showing an inner structure of the 3-D modeling apparatus, an approximately center portion of which is taken along the plane parallel to a Y direction of FIG. 1.
Figure 4:
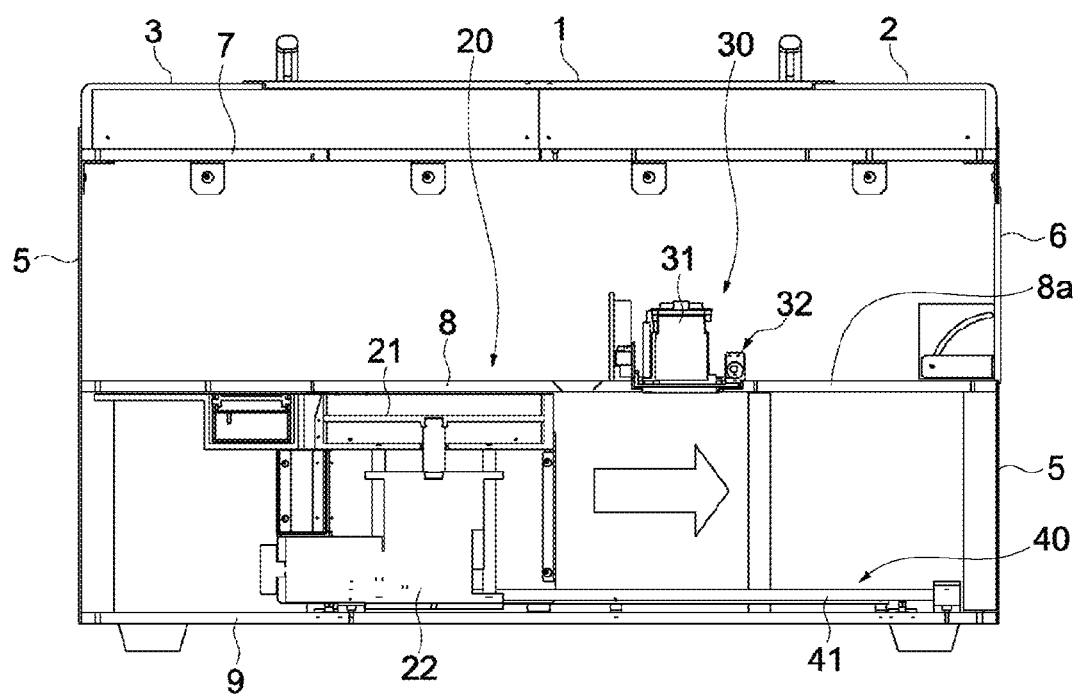
FIG. 4 is a cross-sectional view of the 3-D modeling apparatus of FIG. 3.

FIG. 3 is a perspective view showing an inner structure of the 3-D modeling apparatus 100, an approximately center portion of which is taken along the plane parallel to a Y direction of FIG. 1. FIG. 4 is a cross-sectional view of the 3-D modeling apparatus 100 of FIG. 3.

The 3-D modeling apparatus 100 includes a plurality of support columns 28 (see, FIG. 5), a base plate 9, a print base plate 8, and a top plate 7. The base plate 9, the print base plate 8, and the top plate 7 are connected with the support columns 28 at a predetermined interval.

Figure 5:
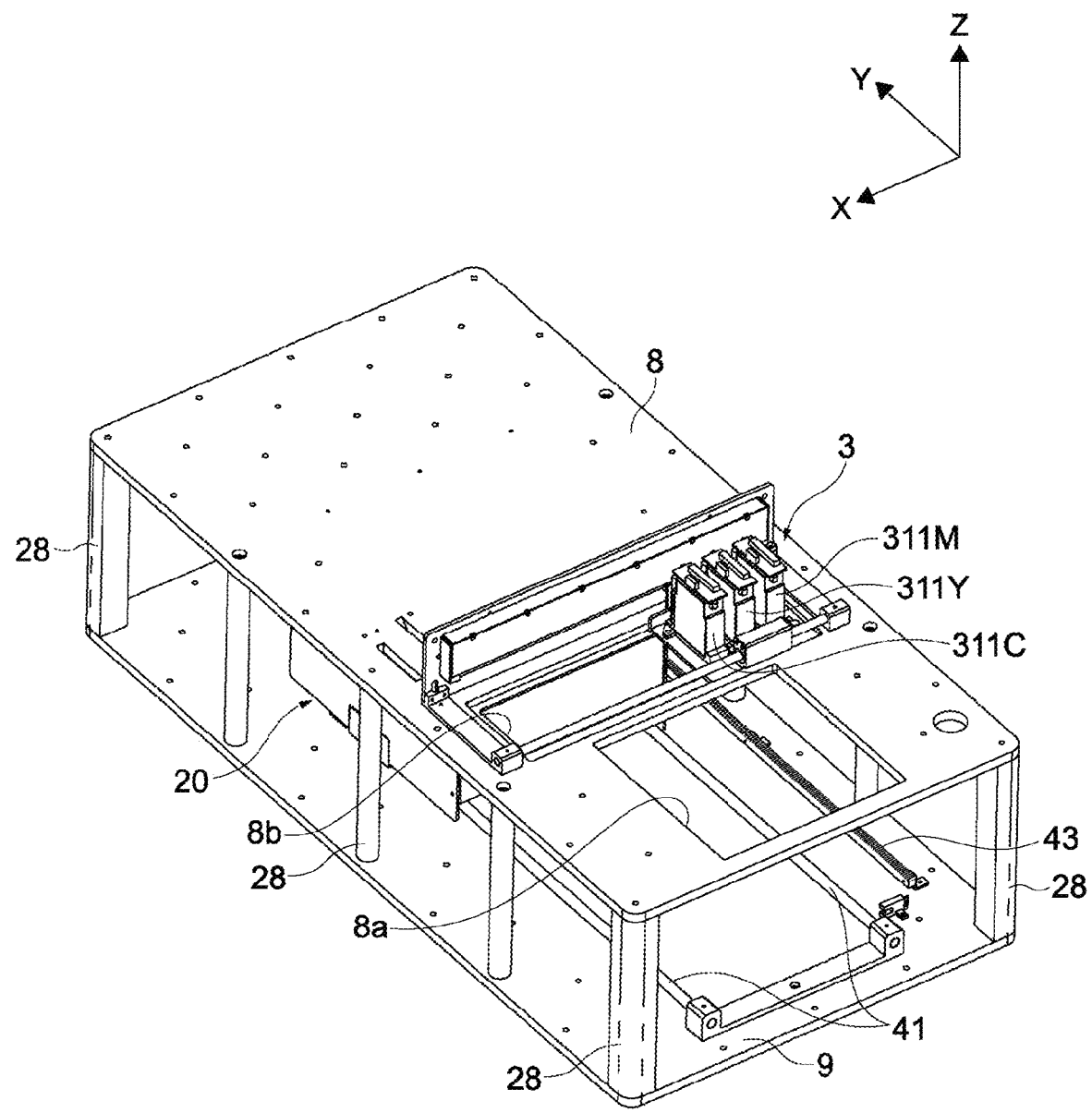
FIG. 5 is a perspective view showing the 3-D modeling apparatus in the state where a casing and a top plate are detached to allow a base plate and a print base plate to be seen.
Figure 6:
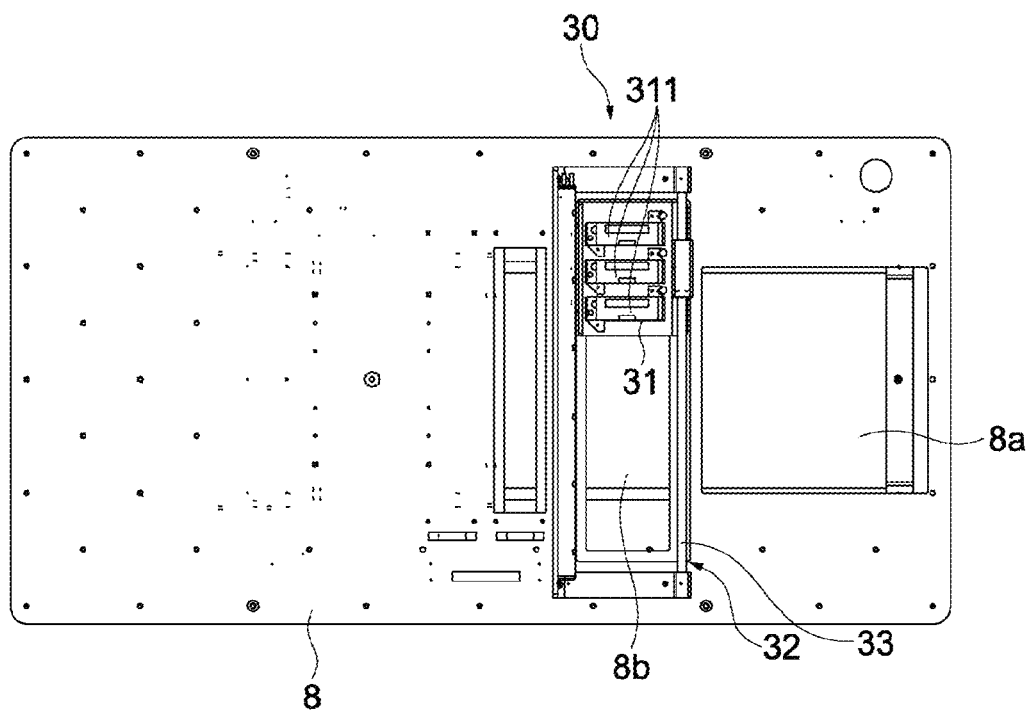
FIG. 6 is a plan view showing the 3-D modeling apparatus in the state of FIG. 5.
Figure 7:
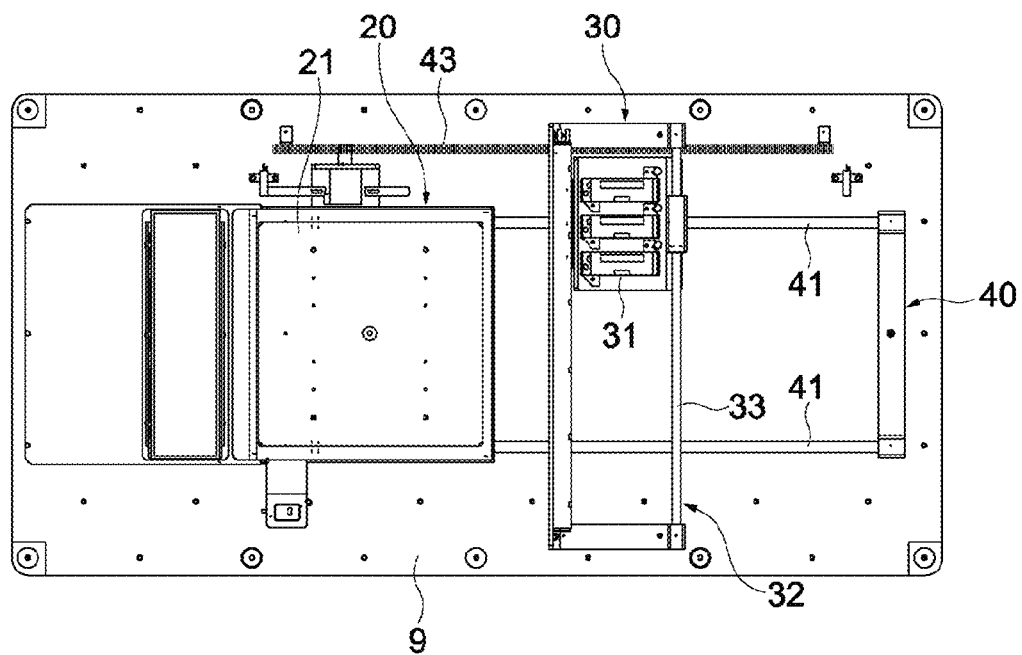
FIG. 7 is a plan view showing the 3-D modeling apparatus in the state where the print base plate is further detached.

FIG. 5 is a perspective view showing the 3-D modeling apparatus 100 in the state where the casing 90 and the top plate 7 are detached to allow the base plate 9 and the print base plate 8 to be seen. FIG. 6 is a plan view showing the 3-D modeling apparatus 100 in the state of FIG. 5. FIG. 7 is a plan view showing the 3-D modeling apparatus 100 in the state where the print base plate 8 is further detached.

As shown in FIGS. 3 to 7, on the base plate 9, a modeling stage unit 20 is provided. In addition, on the print base plate 8, at a position shifted toward the takeout opening cover 6 from the center portion by a predetermined distance in the Y direction, a head unit 30 for supplying a process liquid onto a modeling stage 21 of the modeling stage unit 20 is provided.

The modeling stage unit 20 includes the modeling stage 21 and a lifting and lowering unit 22 that lifts and lowers the modeling stage 21. As the drive mechanism of the lifting and lowering unit 22, for example, a rack and pinion (not shown), a belt drive mechanism (not shown), a linear motor (not shown) driven by an electromagnetic force, or a lifting and lowering cylinder (not shown) that uses, for example, a fluid pressure may be used.

Figure 9:
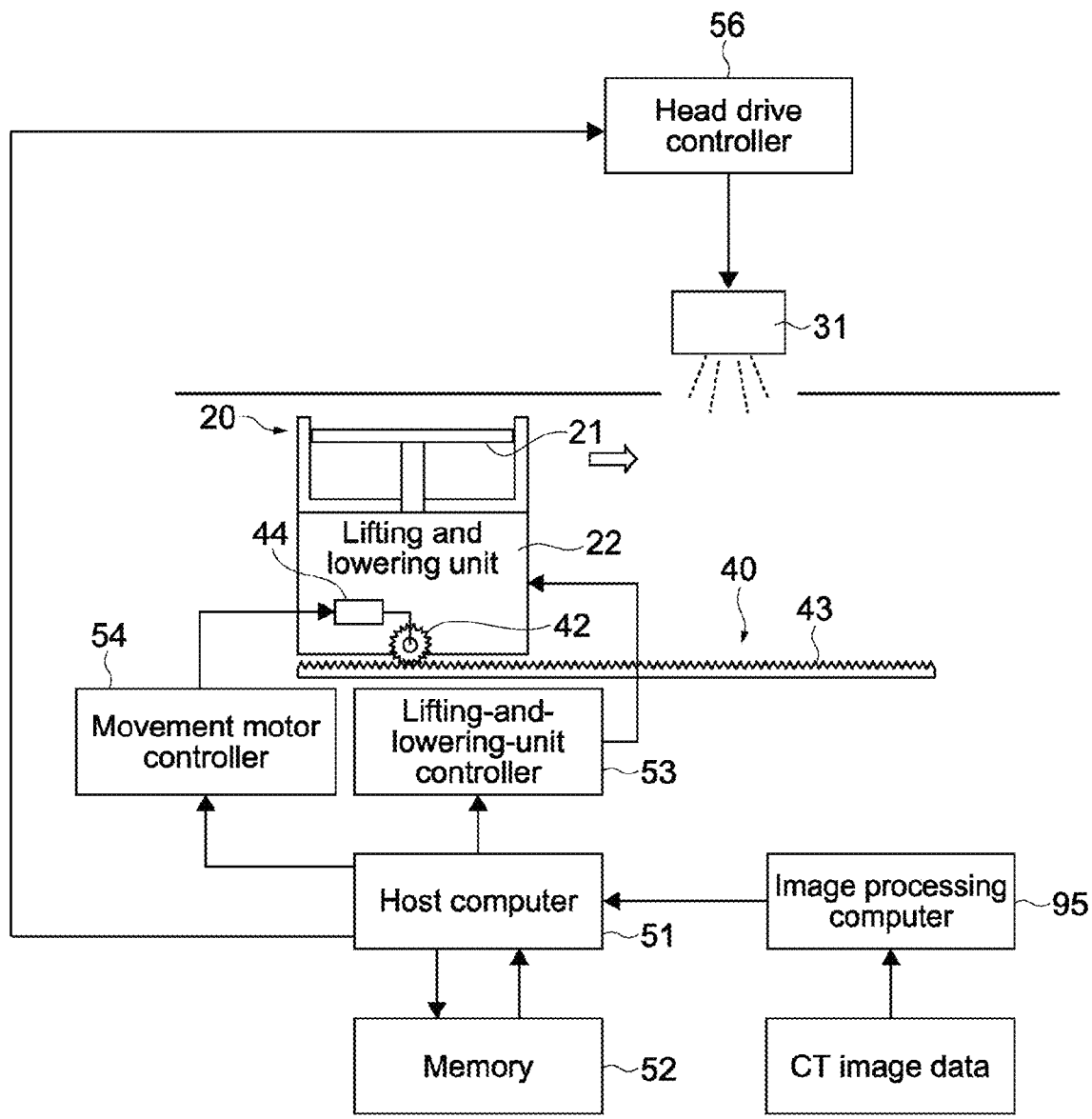
FIG. 9 is a block diagram mainly showing a structure of a control system of the 3-D modeling apparatus.

On the base plate 9, a Y-direction movement unit 40 is provided. The Y-direction movement unit 40 moves the modeling stage unit 20 in the Y direction, and includes guide rails 41 and a drive mechanism. The guide rails 41 are extended on the base plate 9 in the Y direction. The drive mechanism moves the lifting and lowering unit 22 (modeling stage unit 20) along the guide rails 41 in the Y direction. As shown in FIG. 9, the drive mechanism includes a movement motor 44, a pinion gear 42, and a rack gear (see, FIGS. 5 and 9) 43, for example. The pinion gear 42 is driven by the movement motor 44. The rack gear 43 is engaged with the pinion gear 42. The movement motor 44 is provided to, for example, the lifting and lowering unit 22 of the modeling stage unit 20.

The drive mechanism may be formed of various mechanisms such as a ball screw, a belt drive, and a linear motor driven by an electromagnetic force, instead of the rack and pinion as shown in the figure.

As shown in FIGS. 5 and 6, on an end portion of the print base plate 8, a takeout opening 8a is provided from which a 3-D object formed on the modeling stage 21 is taken out. An operator or an operating robot takes out a 3-D object through the takeout openings 5a and 8a with the takeout opening cover 6 being opened.

As shown in FIG. 5, the head unit 30 includes an inkjet head 31 and an X-direction movement unit 32. The inkjet head 31 is provided with ink tanks 311 of a plurality of colors. The X-direction movement mechanism 32 moves the inkjet head 31 in the X direction. The print base plate 8 has an opening 8b that is elongated in the X direction. The inkjet head 31 is movable in the opening 8b in the X direction by the X-direction movement unit 32. Through the opening 8b, an ink as an example of the process liquid is discharged.

The X-direction movement unit 32 slides the inkjet head 31 in the X direction along a guide shaft 33 extended in the X direction using a motor or the like (not shown).

The movement mechanism is formed of at least one of the X-direction movement unit 32, the Y-direction movement unit 40, and the lifting and lowering unit 22.

Figure 8:
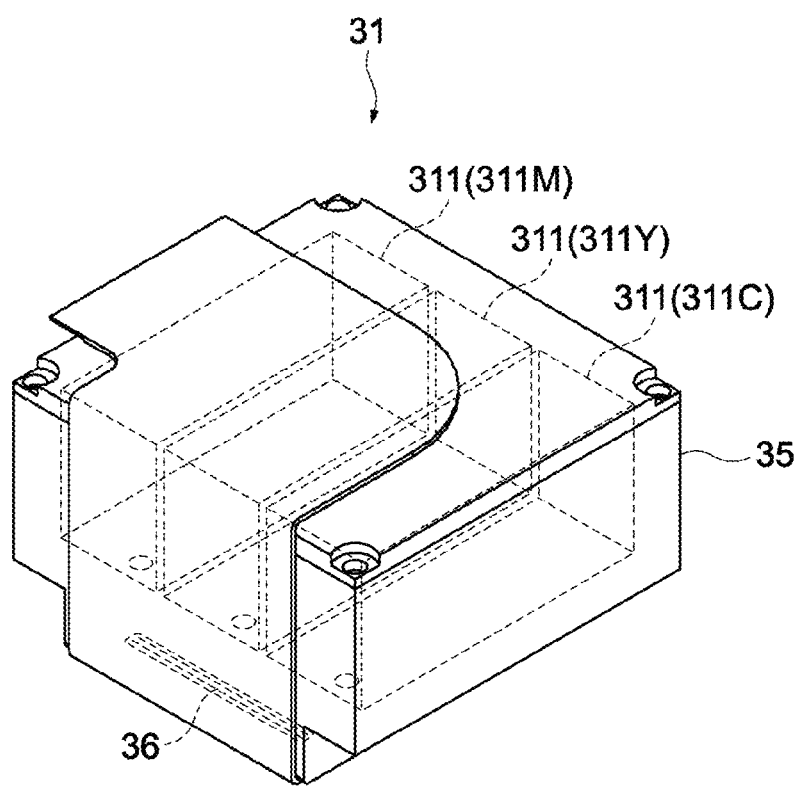
FIG. 8 is a perspective view showing an inkjet head according to the embodiment that is mounted on the 3-D modeling apparatus.

FIG. 8 is a perspective view showing the inkjet head 31 according to the embodiment.

As the inkjet head 31, an inkjet head for typical printer use that has the same structure and functions as those of the inkjet head 31 may be used. For example, in a case 35 of the inkjet head 31, the plurality of ink tanks 311 are provided. The ink tanks 311 are constituted of tanks 311C, 311M, and 311Y in which cyan, magenta, and yellow (hereinafter, abbreviated to CMY) are contained, respectively. In this example, the ink tanks 311C, 311M, and 311Y are arranged in the X direction. Below the ink tanks 311C, 311M, and 311Y, a large number of discharge openings 36 (nozzle) from which inks are discharged are formed. As an inkjet generation mechanism, a piezoelectric type or a thermal type may be used, and a known discharge principle may be used.

By using the color inks as described above, a color 3-D object can be formed.

The inkjet head 31 is not limited to have the shape, the structure, and the like shown in FIG. 8. Various known inkjet heads can be used. In addition to the three colors of CMY, ink tanks of black, white, or a colorless ink may be provided.

The ink according to this embodiment includes one or more kinds of solid salts or dispersion elements that are soluble in water at ordinary temperatures (those salts or dispersion elements are materials for forming a 3-D object, that are contained in a solution or a dispersion liquid as the process liquid). As described later, after the process liquid is discharged from the inkjet head 31, a solvent or a dispersion medium evaporates, thereby precipitating the solid material that is a residual component, with the result that a rod-like (or columnar) 3-D object can be obtained.

When a color material such as sodium salt and lithium salt of a color acid including a carboxyl group or a sulfone group as the salts is selected, a color 3-D object can be obtained. For the color acid salts, a black ink, a color ink, or the like can be used without particular limitation. For example, an aqueous dye typified by a direct color, an acid dye, or the like is used.

Specific examples of the aqueous dye include the following dyes.

As yellow dyes, the following can be used:
C.I. direct yellow 1, 2, 4, 8, 11, 12, 23, 24, 26, 27, 28, 31, 33, 34, 37, 39, 41, 44, 46, 48, 58, 62, 63, 75, 79, 80, 81, 83, 84, 86, 87, 88, 89, 95, 99, 113, 50, 85, 98, 100, 110, 132, 135, 142, 144, 173 or the like; C.I. acid yellow 1, 3, 4, 7, 11, 12, 13, 14, 17, 18, 19, 23, 25, 29, 34, 36, 38, 40, 41, 42, 44, 53, 55, 59, 61, 70, 71, 72, 75, 76, 78, 79, 98, 99, 110, 111, 112, 114, 116, 118, 119, 122, 127, 128, 131, 135, 141, 162, 163, 164, 165, or the like; and Y-104, Y-1189 (produced by ILFORD Imaging Switzerland), or the like.

As magenta dyes, the following can be used:
C.I. direct red 1, 2, 4, 8, 11, 13, 15, 17, 20, 28, 31, 33, 37, 39, 51, 59, 62, 63, 73, 80, 83, 87, 90, 94, 95, 99, 101, 110, 114, 189, 197, 201, 218, 220, 224, 225, 226, 227, 228, 229, 230, 321, or the like; C.I. acid red 1, 4, 6, 8, 9, 13, 14, 15, 18, 21, 26, 27, 32, 35, 37, 42, 51, 52, 57, 75, 77, 80, 82, 83, 85, 87, 88, 89, 92, 94, 97, 106, 110, 111, 114, 115, 117, 118, 119, 129, 130, 131, 133, 134, 138, 143, 144, 145, 154, 155, 158, 168, 180, 183, 184, 186, 194, 198, 199, 209, 211, 215, 216, 217, 219, 249, 252, 254, 256, 257, 262, 265, 266, 274, 276, 282, 283, 303, 317, 318, 320, 321, 322, or the like; or M-377, M-1114 (produced by ILFORD Imaging Switzerland), or the like.

As cyan dyes, the following can be used:
C.I. direct blue 1, 2, 6, 8, 15, 22, 25, 34, 41, 70, 71, 76, 77, 78, 80, 86, 90, 98, 106, 108, 112, 120, 142, 158, 160, 163, 165, 168, 192, 193, 194, 195, 196, 199, 200, 201, 202, 203, 207, 218, 225, 226, 236, 237, 246, 248, 249, 287, 307, or the like; or C.I. acid blue 1, 7, 9, 15, 22, 23, 25, 27, 29, 40, 41, 43, 45, 54, 55, 59, 60, 62, 72, 74, 78, 80, 81, 82, 83, 90, 92, 93, 100, 102, 103, 104, 111, 112, 113, 117, 120, 126, 127, 129, 130, 131, 138, 140, 142, 143, 151, 154, 158, 161, 166, 167, 168, 170, 171, 175, 182, 183, 184, 185, 187, 192, 199, 203, 204, 205, 229, 234, 236, 249, 254, or the like.

As black dyes, the following can be used:
C.I. direct black 2, 4, 9, 11, 17, 19, 22, 32, 38, 51, 56, 62, 71, 74, 75, 77, 80, 94, 105, 106, 107, 108, 112, 113, 117, 118, 132, 133, 146, 151, 154, 168, 171, 194, 195, or the like; C.I. acid black 1, 2, 7, 16, 24, 26, 28, 29, 31, 44, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, 172, 191, 194, 208, or the like; M-1236 (produced by ILFORD Imaging Switzerland); or MJA-371 (produced by Mitsubishi Chemical corporation) or the like.

In addition to the above-mentioned dyes, various dyes can be applied.

The inks according to this embodiment may include, as a solvent, a water-soluble organic solvent in addition to water. As the water-soluble organic solvent, aliphatic monovalent alcohol, polyalcohol, a polyalcohol derivative, or the like can be used.

As the aliphatic monovalent alcohol, a lower alcohol such as methyl alcohol, ethyl alcohol, n-propyl alcohol, i-propyl alcohol, n-butyl alcohol, s-butyl alcohol, and t-butyl alcohol can be used.

As the polyalcohol, alkylene glycols or alkyl glycols such as ethylene glycol, diethylene glycol, triethylene glycol, propylene glycol, butylene glycol, and glycerol, polyalkylene glycol such as polyethylene glycol and polypropylene glycol, or thiodiglycol can be used, for example.

As the polyalcohol derivative, for example, lower alkyl ethers of the above-mentioned polyalcohol, such as ethylene glycol dimethyl ether, cellosolve, and diethylene glycol monomethyl ether, or lower carboxylic esters of the above-mentioned polyalcohol, such as ethylene glycol diacetate, can be used as appropriate within the range in which the 3-D modeling can be realized.

Further, in the solvent, additives such as various surfactants, antifoams, moisturizers, pH adjusters, or fungicides can be added. In addition, alcohol amines such as monotriethanol amine and ditriethanol amine, amides such as dimethyl formamide and dimethyl ketone amide, ketones such as methyl ethyl ketone, or ethers such as dioxane can be used as appropriate.

As the surfactants, a nonionic surfactant, an anionic surfactant, a cationic surfactant, or a zwitterionic surfactant can be used. In particular, since the color materials are anionic in many cases, the nonionic surfactant, the anionic surfactant, or the zwitterionic surfactant are easily used in consideration of preservation stability.

Examples of the nonionic surfactant include polyoxyethylene alkyl phenyl ether, polyoxyethylene alkyl ether, polyoxyethylene fatty acid ester, sorbitan fatty acid ester, polyoxyethylene sorbitan fatty acid ester, polyoxyethylene glycerin fatty acid ester, polyglyceryl fatty acid ester, polyoxyethylene sorbit fatty acid ester, polyoxyethylene sterol, polyoxyethylene polyoxypropylene ether, polyoxyethylene fatty acid amide, a polyoxyethylene polyoxypropylene block copolymer, nonionic acetylene glycol surfactant, tetramethyl decynediol, and a tetramethyl decynediol ethylene oxide adduct.

Examples of the anionic surfactant include alkyl benzene sulfonate, alkyl phenyl sulfonate, alkyl naphthalene sulfonate, higher fatty acid, sulfate ester of higher fatty acid ester, sulfonate of higher fatty acid ester, sulfate ester and sulfonate of higher alcohol ether, higher alkyl sulfosuccinate, a formalin condensate of naphthalene sulfonate, polystyrene sulfonate, polyacrylate, polyoxyethylene alkyl ether phosphate, alkyl ether carboxylate, alkyl sulfate, an acrylic-acrylic ester copolymer, a methacrylic-methacrylic ester copolymer, a styrene-acrylic copolymer, a styrene-acrylic-acrylic ester copolymer, a styrene-methacrylic copolymer, and a styrene-methacrylic-methacrylic ester copolymer.

Examples of the zwitterionic surfactant include a silicone-series surfactant such as betaine, sulfobetaine, sulfate betaine, imidazoline, and a polysiloxane polyoxyethylene adduct; perfluoroalkyl carboxylate; perfluoroalkyl sulfonate; a fluorine-series surfactant such as oxyethylene perfluoroalkyl ether; and a biosurfactant such as a spiculisporic acid, rhamnolipid, and lysolecithin.

(Control System of 3-D Modeling Apparatus)

FIG. 9 is a block diagram mainly showing a structure of a control system of the 3-D modeling apparatus 100.

The control system includes a host computer 51, a memory 52, an image processing computer 95, a movement motor controller 54, a lifting-and-lowering-unit controller 53, and a head drive controller 56. Those components partly or entirely constitute control means.

The host computer 51 performs an overall control on the drives of the memory 52 and the various controllers. The memory 52 is connected to the host computer 51.

The image processing computer 95 loads CT (computed tomography) image data as a cross-sectional image of a modeling-target object as will be described later, and performs image processings such as conversion of the CT image data into a BMP (bitmap) format. Typically, the image processing computer 95 is provided separately from the 3-D modeling apparatus 100 and connected to the host computer 51 via a USB (universal serial bus) or the like, and transmits, to the host computer 51, stored image data that has been subjected to the image processing.

The CT is not limited to a CT using an X ray and means a CT in a broad sense that includes a SPECT (single photon emission CT), a PET (positron emission tomography), an MRI (magnetic resonance imaging), and the like.

The form of the connection between the host computer 51 and the image processing computer 95 is not limited to the USB but may be an SCSI (small computer system interface) or another form. In addition, it makes no difference whether a wired connection or a wireless connection is used. It should be noted that the image processing computer 95 may be a device for image processings that is mounted on the 3-D modeling apparatus 100. Further, in the case where the image processing computer 95 is separated from the 3-D modeling apparatus 100, the image processing computer 95 may be a CT scanning apparatus that generates image data.

The lifting-and-lowering-unit controller 53 controls the drive mechanism of the lifting and lowering unit 22, thereby controlling the height of the modeling stage 21.

The movement motor controller 54 controls the drive of the Y-direction movement unit 40, thereby controlling the start or stop of the modeling stage unit 20, a movement speed thereof, and the like.

The head drive controller 56 outputs, to an inkjet generation mechanism in the inkjet head 31, a drive signal in order to control the ejection amount of the ink. Further, the head drive controller 56 controls the drive of a motor (not shown) of the X-direction movement unit 32, thereby controlling the position of the inkjet head 31 in the X direction.

The host computer 51, the image processing computer 95, the lifting-and-lowering-unit controller 53, the movement motor controller 54, and the head drive controller 56 may be implemented by the following hardware or combinations of the hardware and software. Examples of the hardware include a CPU (central processing unit), a DSP (digital signal processor), an FPGA (field programmable gate array), an ASIC (application specific integrated circuit), or hardware similar to those.

The memory 52 may be a solid-state memory (semiconductor, dielectric, or magneto-resistive memory) or a storage device such as a magnetic disc and an optical disc.

(Operation of 3-D Modeling Apparatus)

Next, a method of producing a 3-D object will be described. FIGS. 10 and 11 are diagrams showing a method of producing a 3-D object. With reference to FIGS. 10 and 11, based on one-layer CT image data in the X direction out of tomographic images obtained from the image processing computer 95, an operation of forming a part of a lattice-shaped object corresponding to the one layer will be described.

First, based on the control by the head drive controller 56, the movement motor controller 54, and the lifting-and-lowering-unit controller 53, the inkjet head 31 and the modeling stage 21 are positioned to predetermined positions. The height (distance of the modeling stage 21 from the inkjet head 31) of the modeling stage 21 is set as appropriate. During a time period when the lattice-shaped object corresponding to the one layer in the Z direction is formed, the height of the modeling stage 21 is fixed, for example.

After positioning, as shown in FIGS. 10A to 10C, ink is continuously discharged (ink droplets are continuously discharged) from the inkjet head 31 for a predetermined time period, a substantially vertical rod-like body (columnar body) 85a having a height of approximately 100 μm is formed. The rod-like body 85a has a width of approximately 20 to 40 μm. This width can be obtained when the solvent or the dispersion medium evaporates from the ink immediately after the ink is discharged from the inkjet head 31, for example, about 1 second later, and the material (salt or dispersion element) is solidified. That is, the ink are sequentially solidified in the order of dropping onto the modeling stage 21, and the object grows in a vertical direction, thereby producing the rod-like body 85a.

A discharge frequency for each ink droplet may be lower than that from a head used in a typical printer. In this embodiment, the discharge frequency is set to 10 to 20 Hz, for example, but can be changed when necessary. The amount of discharge of the ink can also be set as appropriate.

As shown in FIG. 10D, the inkjet head 31 or the modeling stage 21 are moved by approximately 100 μm in the X direction, for example. Like the operations shown in FIGS. 10A to 10C, a rod-like body (columnar body) 85b having a height of approximately 100 µm is formed by discharging the ink (see, FIGS. 10D to 10F).

Figure 11A:
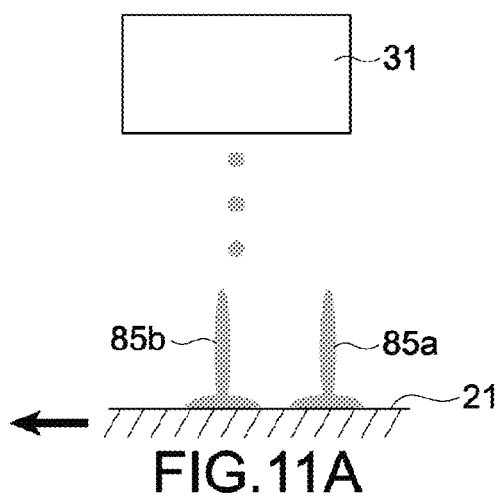
FIG. 11 are diagrams showing the continuation of the method of producing a lattice-shaped 3-D object shown in FIG. 10.
Figure 11D:
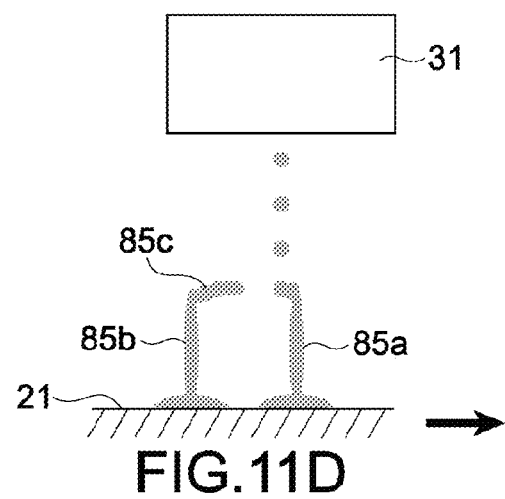
Figure 11B:
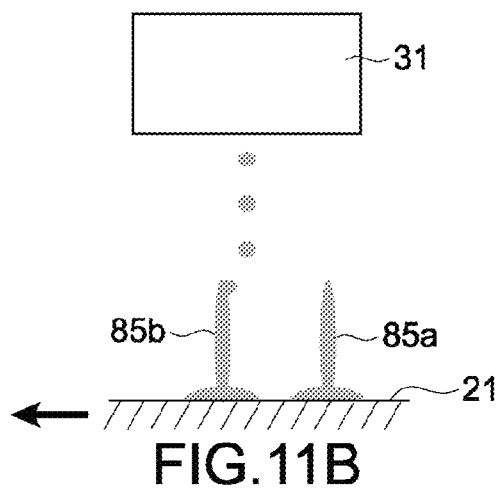
Figure 11E:
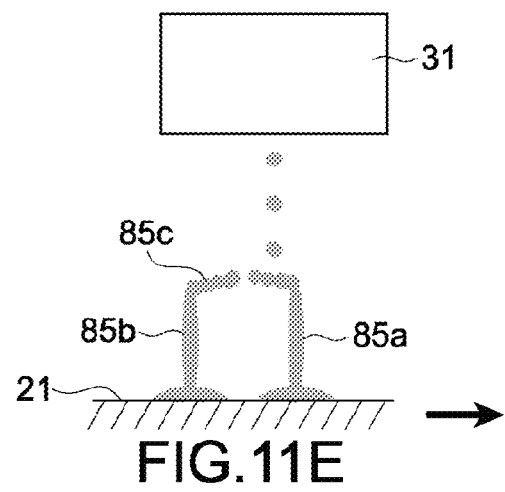
Figure 11C:
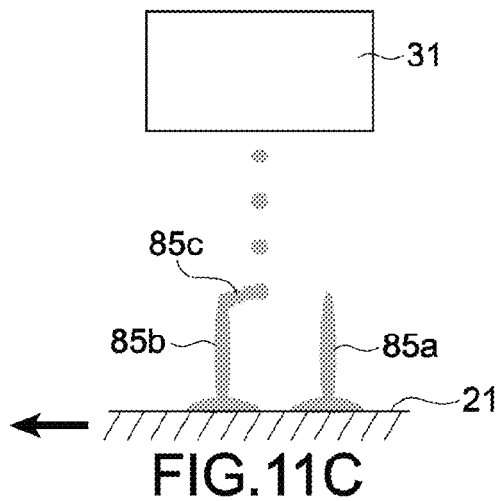

Next, as shown in FIGS. 11A to 11C, during a time period when the inkjet head 31 or the modeling stage 21 is being moved, for example, when the modeling stage 21 is moved in a negative X direction, the ink is continuously discharged from the inkjet head 31. As a result, a rod-like body 85c is formed to be extended in a non-vertical direction, e.g., in a substantially horizontal direction, from the vertical rod-like body 85b.

Depending on a relative speed of the inkjet head 31 and the modeling stage 21 in the X direction or depending on a viscosity (or weight) of the ink, the rod-like body 85c may grow in the horizontal direction or in an oblique direction in FIGS. 11A to 11C. The oblique direction may include an upward oblique direction and a downward oblique direction.

Figure 11F:
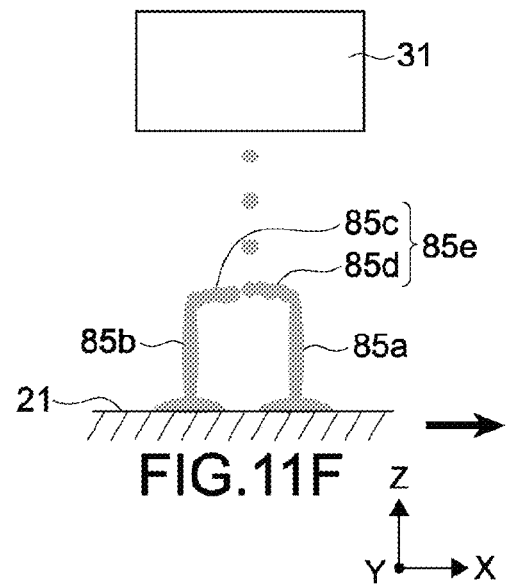

Then, as shown in FIGS. 11D to 11F, during a time period when the inkjet head 31 or the modeling stage 21 is moved so that the modeling stage 21 is seemingly moved in a positive X direction, the ink is continuously discharged from the inkjet head 31. As a result, a rod-like body 85d is formed to be extended from the vertical rod-like body 85b in a substantially horizontal direction, for example, and is combined with the horizontal rod-like body 85c. Thus, a horizontal rod-like body 85e that connects the two vertical rod-like bodies 85a and 85b is formed.

As described above, the solvent or the dispersion medium spontaneously evaporates, and the material is precipitated and solidified, with the result that the horizontal rod-like body 85e can be bridged between the two vertical rod-like bodies 85a and 85b.

Figure 12:
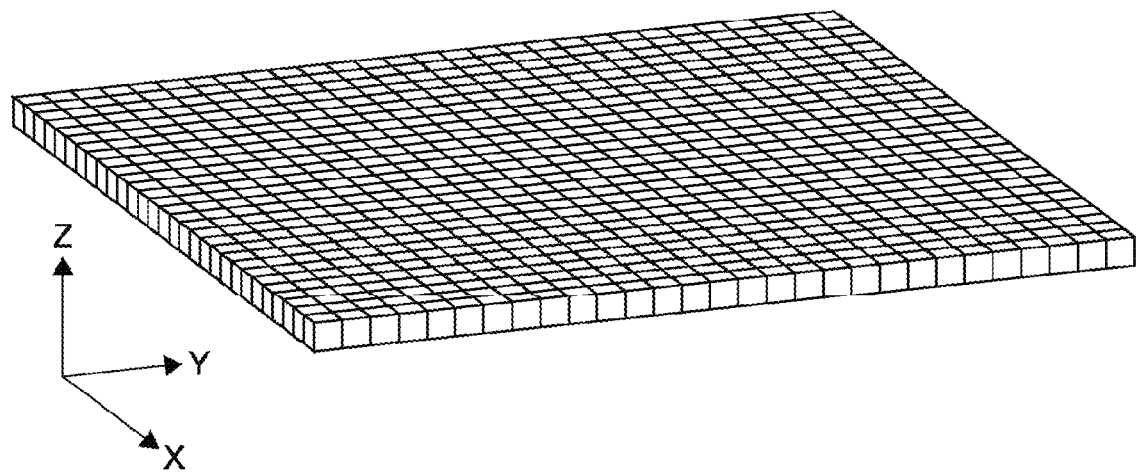
FIG. 12 is a perspective view showing an example of an object corresponding to one-layer data, out of tomographic image data of a modeling target object.

The 3-D modeling apparatus 100 repeatedly performs the operations shown in FIGS. 10 and 11 in both of the X and Y directions based on the CT image data of the one layer, thereby making it possible to form an object corresponding to the one layer shown in FIG. 12, for example. FIG. 12 shows the object that corresponds to the one layer and is a square in a plan view in an easy-to-understand manner.

Figure 13:
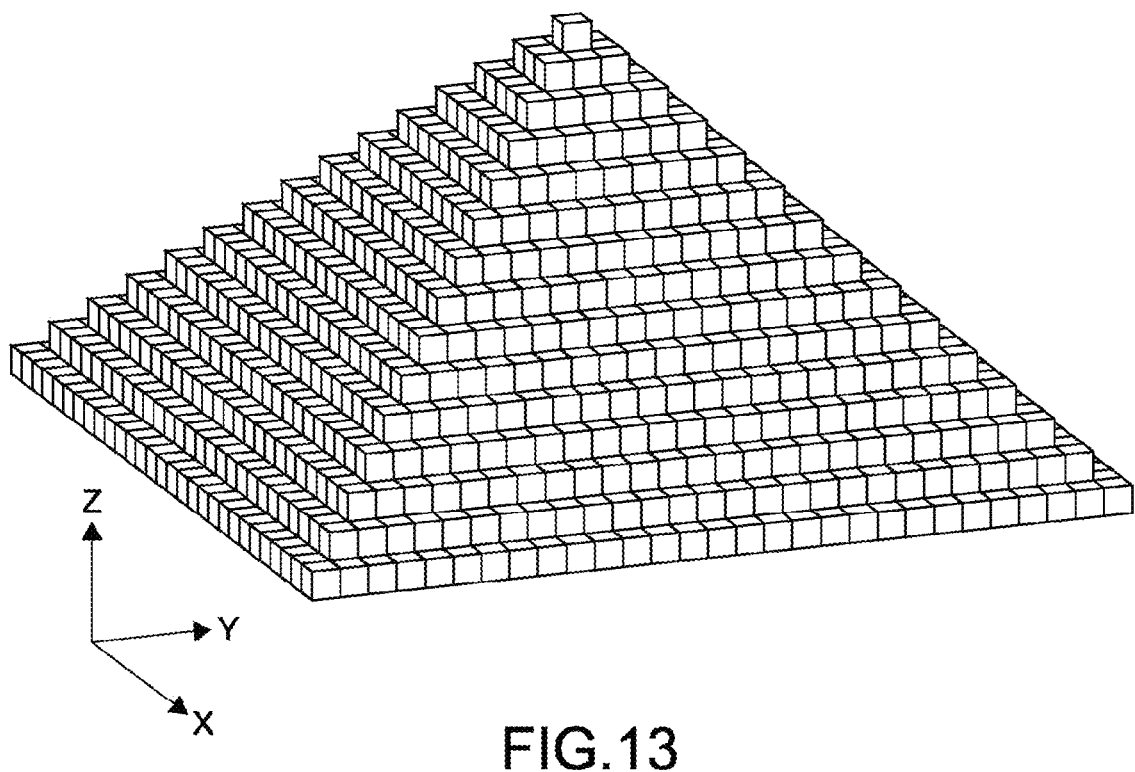
FIG. 13 is a perspective view showing a 3-D object formed.
Figure 14A:
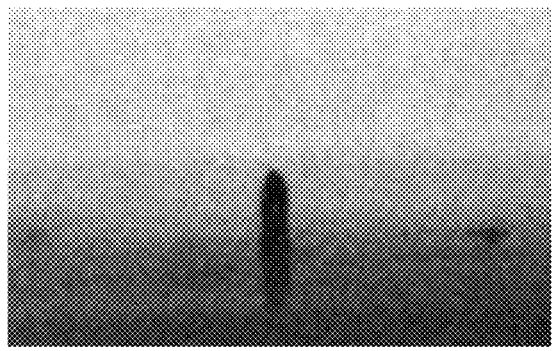
FIG. 14 are pictures sequentially showing states where the 3-D object is formed by operations of the 3-D modeling apparatus.
Figure 14B:
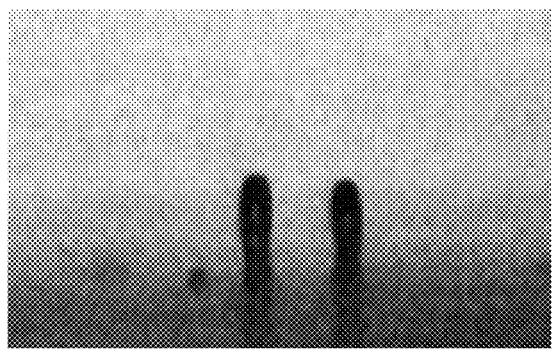
Figure 14C:
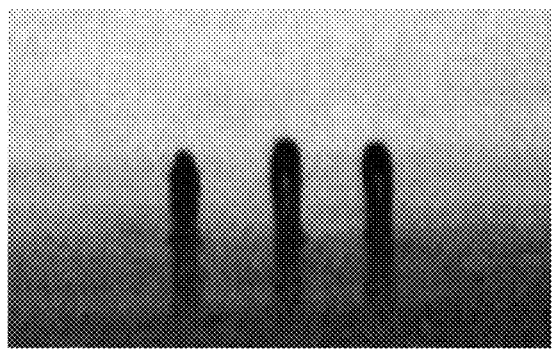
Figure 14D:
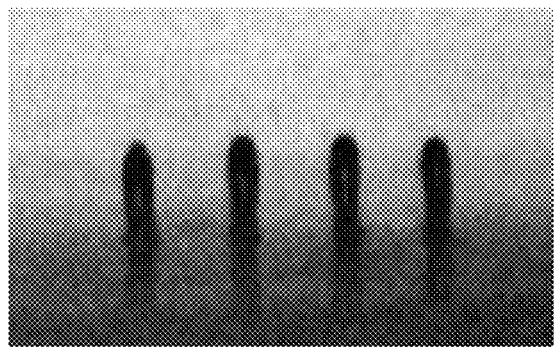
Figure 14E:
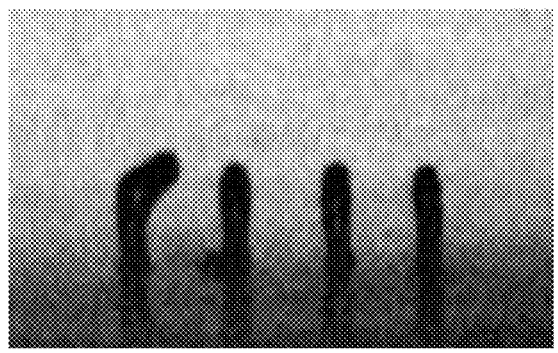
Figure 14F:
Figure 15A:
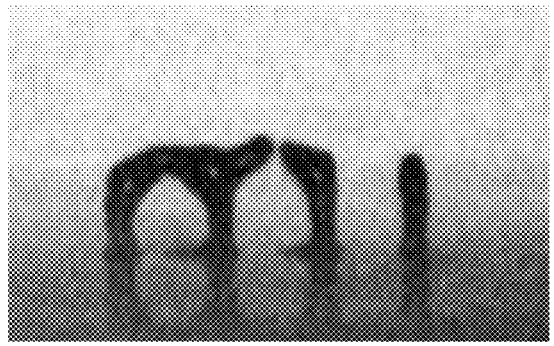
FIG. 15 are pictures showing the continuation of the pictures shown in FIG. 14.
Figure 15B:
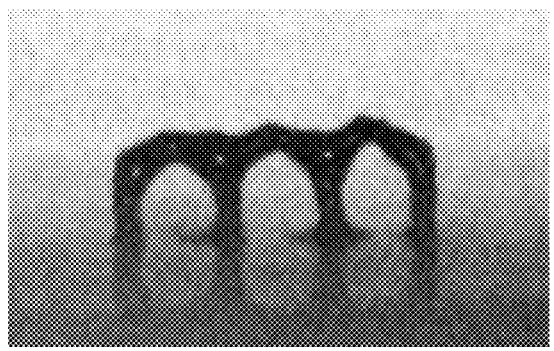
Figure 15C:
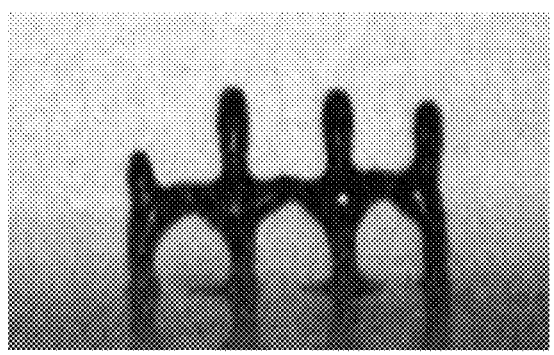
Figure 15D:
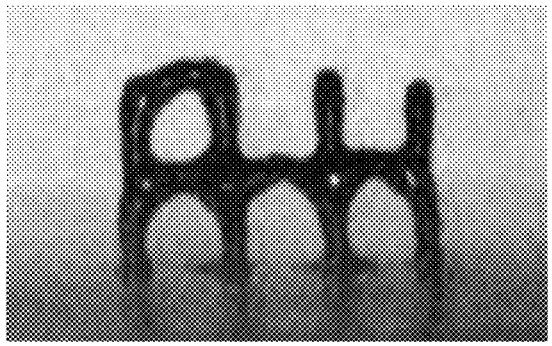
Figure 15E:
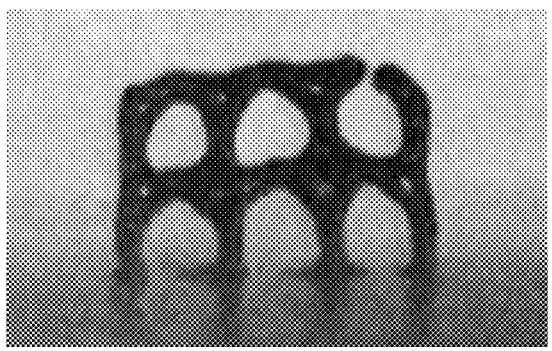
Figure 15F:
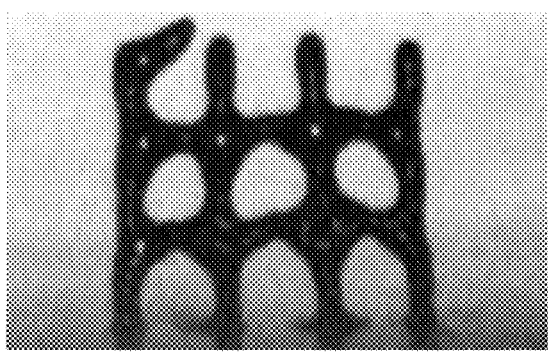

In addition, based on the CT image data of a plurality of layers, the 3-D modeling apparatus 100 lowers the modeling stage 21 by 100 µm for each layer, and repeatedly performs the above-mentioned operations, with the result that a 3-D object having a desired shape can be obtained. FIG. 13 is a perspective view showing a 3-D object formed. Such a square-pyramidal 3-D object can be formed. Any shape of the 3-D object can of course be applied.

It should be noted that in the case where a color 3-D object is formed, for example, the image processing computer 95 performs a multivalued processing on the CT image data, and the 3-D modeling apparatus 100 generates an image that is selectively colored for each area for the image that has been subjected to the multivalued processing. The 3-D modeling apparatus 100 can form a color 3-D object based on the colored image data.

Of course, the lattice-shaped 3-D object may be formed in white, black or another color other than white and black, in addition to the colors. Alternatively, the object can be formed in grayscale.

As described above, in the 3-D modeling apparatus 100 according to this embodiment, since the solvent or the dispersion medium evaporates, and the material is precipitated, to form a 3-D object, it is unnecessary to use a UV curing resin and install a UV irradiation apparatus. Accordingly, it is possible to expand the range of options of the material and realize the reduction in size of the 3-D modeling apparatus 100. In addition, UV light is not used, which can improve security.

In particular, the lattice-shaped 3-D object is formed, thereby making it possible to provide a scaffolding member used for regenerating body tissues in a field of regenerative medicine or the like. For example, Japanese Patent Application Laid-open No. 2009-95401 and Japanese Patent Application Laid-open No. 2009-22480 propose a porous scaffolding member. As a substitution thereof, the 3-D object according to this embodiment can be applied.

In the field of the regenerative medicine, a technique is known in which, in the case where body tissues are to be regenerated in a bone defect of a patient, a porous biocompatible material is puttied, to cause self-propagation of bone cells, thereby realizing regeneration. However, there is a problem in that, when a doctor putties a biocompatible material into a defect part during a surgery, the holes of the porous material are closed, resulting in a poor regeneration rate.

In addition, there is another technique in which a defect part is manually modeled, and a porous, lattice-shaped 3-D object is fitted to the defect part of the patient, thereby regenerating the body tissues in the same way. However, the defect part has a three-dimensional shape, so it is difficult to manually form the 3-D object. The porous material can indeed be formed by the 3-D modeling apparatus 100, but it is difficult to produce a small-pitch lattice-shaped 3-D object using a modeling apparatus in related art. For example, if a lattice-shaped 3-D object is produced by a modeling apparatus that uses a UV curing resin or the like, the pitch of the lattice is approximately 500 µm at minimum, which may be greater than a lattice pitch of the 3-D object according to this embodiment. This is because the UV curing resin has a low viscosity in general. In addition, a modeling apparatus that uses a powder material suffers from a problem in that powders clog in the holes of the lattice, for example.

Figure 17A:
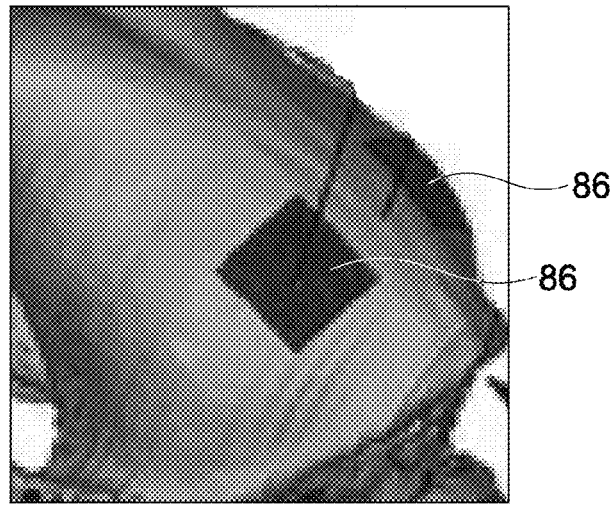
FIG. 17A is a diagram showing a defect part in a cranial bone of a person.
Figure 17B:
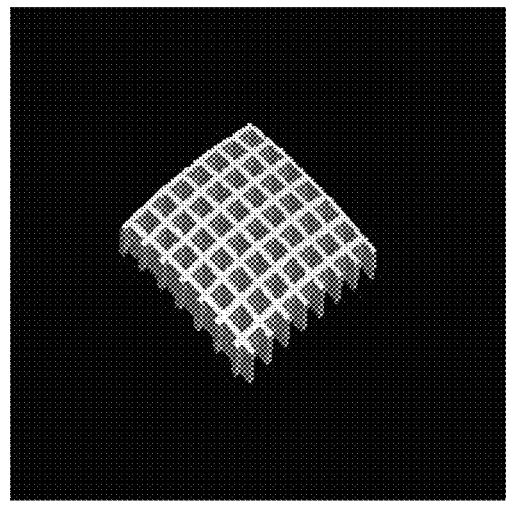
FIG. 17B is a diagram showing a lattice-shaped object corresponding to the shape of the defect part, which is formed by the 3-D modeling apparatus.

FIG. 17A is a diagram showing a cranial bone of a person, for example. In the case where a part 86 of the cranial bone has a defect or necroses, the 3-D modeling apparatus 100 can form a lattice-shaped object corresponding to the shape of the defect part 86 on the basis of CT image data of the defect part 86.

As described above, in this embodiment, the lattice-shaped 3-D object is formed based on the CT image data, so a model that precisely reproduces the defect part or the necrosis part can be easily obtained.

Further, in this embodiment, the water-soluble ink is used, so the following effect can be obtained. For example, after a lattice-shaped 3-D object according to this embodiment is used as the scaffolding member, and a biomaterial is regenerated into the 3-D object, a doctor can remove a 3-D object as an unnecessary precipitated structure by flushing with water.

Figure 16:
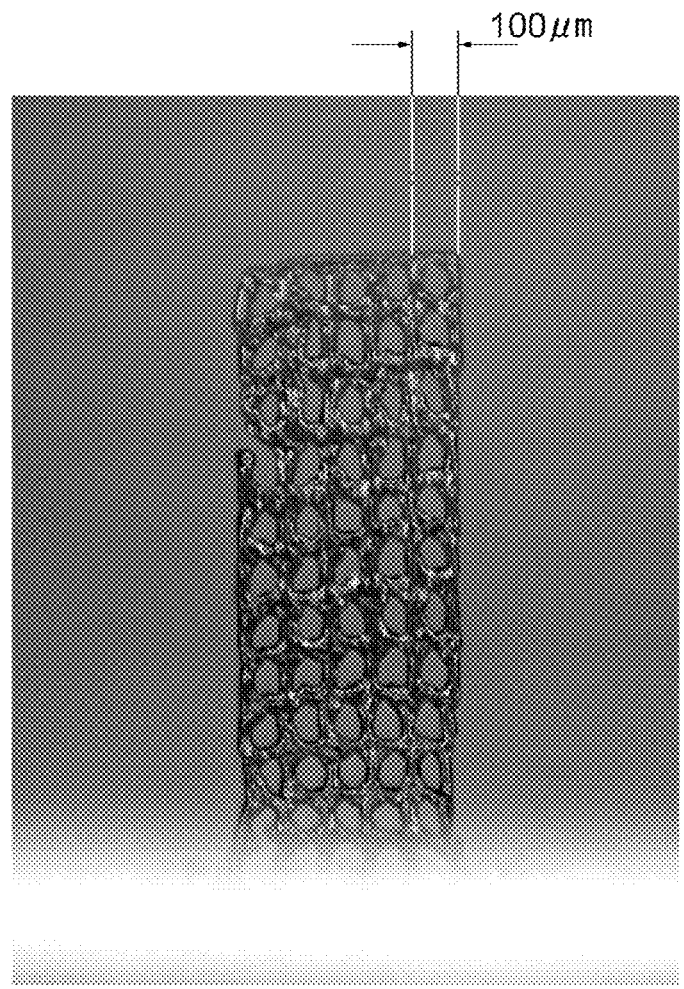
FIG. 16 is a picture showing the 3-D object formed by the operations shown in FIGS. 14 and 15.

FIGS. 14A to 14F, FIGS. 15A to 15F, and FIG. 16 are pictures sequentially showing states where an object is formed by the operations of the 3-D modeling apparatus 100. The pictures are continuous from FIGS. 14A to 14F to FIGS. 15A to 15F. FIG. 16 is the picture showing the object in a plan view that stands in the Z direction. It should be noted that the inventors of the present invention did not form a two-dimensional object on a horizontal X-Y plane, but form the two-dimensional object only in the Z direction in this experiment.

A lattice pitch in those pictures is approximately 100 µm as described above.

Further, in the experiment conducted by the inventors of the present invention, not only the lattice-shaped object having a quadrangular hole but also an object that stands in the Z direction, which is like an A-letter shape, was succeeded in being produced.

As is apparent from this experiment, a planar object that stands in the Z direction, specifically, that is formed on a Z-X plane may be a part corresponding to one layer of a tomographic image of a modeling-target object. In this case, the one-layer object only has to be stacked horizontally, i.e., in the Y direction.

(Examples of Ink)
Hereinafter, examples of the ink will be given.

Example 1

Combination of Salts, Solvent (Water), and Surfactant

A yellow dye Y1189 (material name: 1,3-naphthalenedisulfonic acid, 7-[[4-[[4,6-bis-[(3-sulfopropyl)thio]-1,3,5-triazine-2-yl]amino]-3-methoxyphenyl]azo]tetrasodium salt) that is commercially available from ILFORD Imaging Switzerland as salts and surfynol E1010 (material name: 2,4,7,9-tetramethyl-5-desine-4,7-diol-di(polyoxyethylene)ether) produced by Nissin Chemical Industry Co., Ltd. as a surfactant were measured to have concentrations of 20 wt % and 0.3 wt %, respectively, in pure water as a solvent, to prepare ink.

Example 2

Combination of Salts, Moisturizer, Solvent (Water), and Surfactant

The yellow dye Y1189 (material name: 1,3-naphthalenedisulfonic acid, 7-[[4-[[4,6-bis-[(3-sulfopropyl)thio]-1,3,5-triazine-2-yl]amino]-3-methoxyphenyl]azo]tetrasodium salt) that is commercially available from ILFORD Imaging Switzerland as salts, trimethylol propane as a moisturizer, and the surfynol E1010 (material name: 2,4,7,9-tetramethyl-5-desine-4,7-diol-di(polyoxyethylene)ether) produced by Nissin Chemical Industry Co., Ltd. as a surfactant were measured to have concentrations of 16 wt %, 16 wt %, and 0.3 wt %, respectively, in pure water as a solvent, to prepare ink.

Example 3

Combination of Salts, Moisturizer, Solvent (Water), and Surfactant

Different from Example 2 in Concentrations

The yellow dye Y1189 (material name: 1,3-naphthalenedisulfonic acid, 7-[[4-[[4,6-bis-[(3-sulfopropyl)thio]-1,3,5-triazine-2-yl]amino]-3-methoxyphenyl]azo]tetrasodium salt) that is commercially available from ILFORD Imaging Switzerland as salts, trimethylol propane as a moisturizer, and the surfynol E1010 (material name: 2,4,7,9-tetramethyl-5-desine-4,7-diol-di(polyoxyethylene)ether) produced by Nissin Chemical Industry Co., Ltd. as a surfactant were measured to have concentrations of 10 wt %, 10 wt %, and 0.3 wt %, respectively, in pure water as a solvent, to prepare ink.

Example 4

Combination of Salts, Moisturizer, Solvent (Water), and Surfactant

Different from Example 3 in Color Material

C.I. direct blue 199 as salts, trimethylol propane as a moisturizer, and the surfynol E1010 (material name: 2,4,7,9-tetramethyl-5-desine-4,7-diol-di(polyoxyethylene)ether) produced by Nissin Chemical Industry Co., Ltd. as a surfactant were measured to have concentrations of 10 wt %, 10 wt %, and 0.3 wt %, respectively, in pure water as a solvent, to prepare ink.

(InkJet Head According to Another Embodiment)

Figure 18:
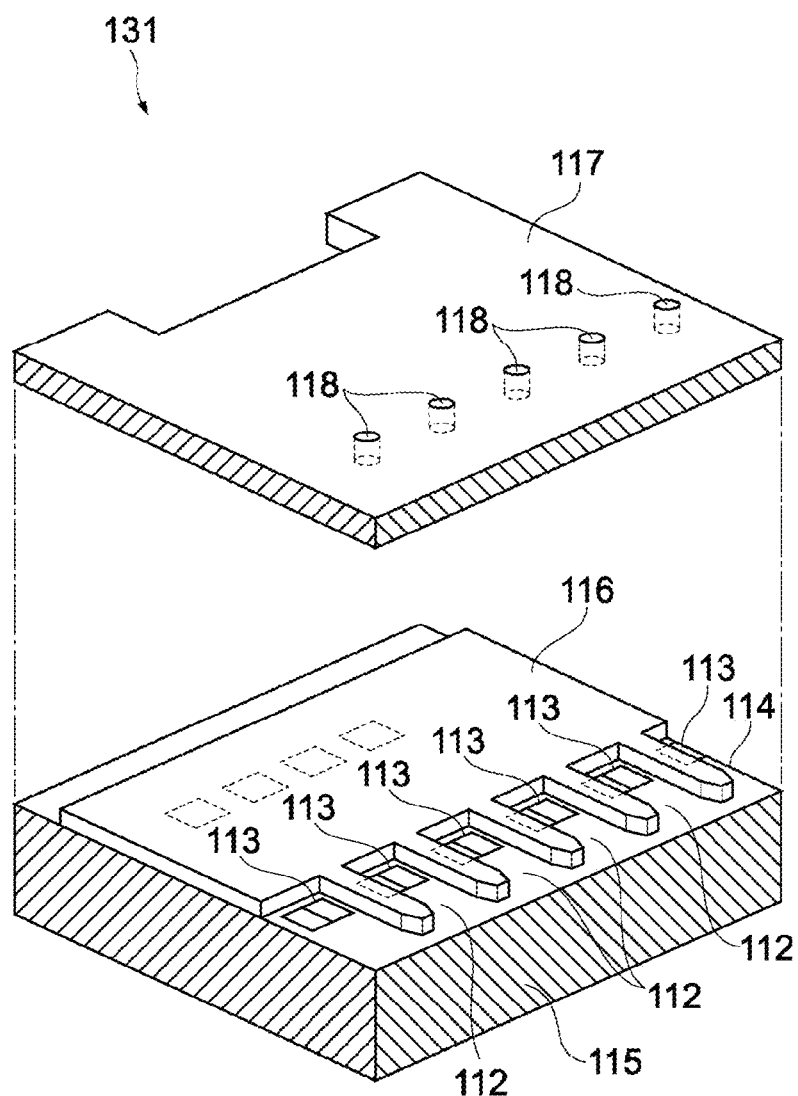
FIG. 18 is an exploded perspective view showing a structure of an inkjet head according to another embodiment.

FIG. 18 is an exploded perspective view showing a structure of an inkjet head according to another embodiment. An inkjet head 131 to be described in the following discharges ink in directions, unlike a typical inkjet head that discharges ink in one direction as described above. The inkjet head 131 adopts a thermal type.

In FIG. 18, a nozzle sheet 117 is bonded on a barrier layer 116. The figure shows a state where the nozzle sheet 117 is taken apart.

A substrate member 114 includes a semiconductor substrate 115 formed of silicon or the like and heat-generation resistors 113 formed on one surface of the semiconductor substrate 115. The heat-generation resistors 113 are electrically connected to an electrical circuit of the head drive controller 56 through a conductor portion (not shown) that is formed on the semiconductor substrate 115.

The barrier layer 116 is formed of a dry film resist of exposure curing type. The barrier layer 116 is formed by being layered on an entire surface of the semiconductor substrate 115, on which the heat-generation resistors 113 are formed, and then removing an unnecessary part by a photolithography process.

The nozzle sheet 117 includes a plurality of nozzles 118. The nozzle sheet 117 is formed by an electroforming technique using nickel, and is bonded onto the barrier layer 116 so that the nozzles 118 are opposed to the heat-generation resistors 113.

Ink chambers 112 are constituted of the substrate member 114, the barrier layer 116, and the nozzle sheet 117 so as to surround the heat-generation resistors 113. That is, the substrate member 114 forms a bottom of the ink chambers 112, the barrier layer 116 forms sidewalls thereof, and the nozzle sheet 117 forms a top wall thereof in FIG. 18. With this structure, the ink chambers 112 have an opening surface on a right-hand front side in FIG. 18, and the opening surface and an ink flow path (not shown) are communicated with each other.

One inkjet head 131 includes the plurality of heat-generation resistors 113 by the hundred and the ink chambers 112 provided with the heat-generation resistors 113, respectively. The inkjet head 131 uniquely selects one from the heat-generation resistors 113 in accordance with a command from the host computer 51, and can discharge ink in the ink chamber 112 corresponding to the selected heat-generation resistor 113 from the nozzle 118.

That is, the ink is filled in the ink chamber 112 from an ink tank (not shown) connected to the inkjet head 131. Then, a pulse current is flown to the heat-generation resistor 113 for a short time period, for example, 1 to 3 μs, thereby heating the heat-generation resistor 113. As a result, air bubbles of the ink generate in a part that is contact with the heat-generation resistor 113 and inflate, thereby push away the ink by a certain volume (ink boils). Thus, ink having a volume almost the same as the ink pushed away in the part that is in contact with the nozzle 118 is discharged as droplets from the nozzle 118.

Figure 19A:
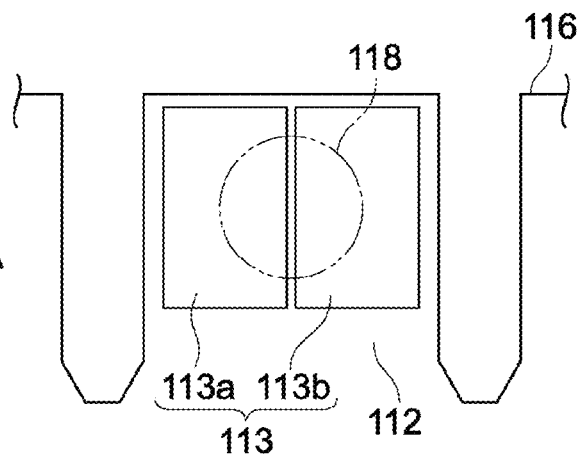
FIG. 19 are a plan view and a cross-sectional view, respectively, each showing a disposition of a heat-generation resistor in more detail.
Figure 19B:
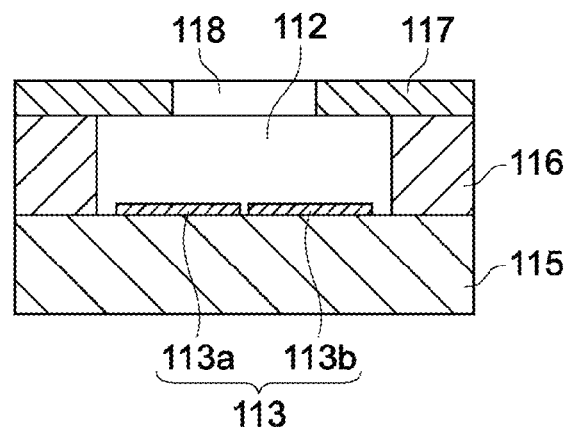

FIGS. 19A and 19B are a plan view and a cross-sectional view showing a disposition of the heat-generation resistor 113 in more detail, respectively. In FIG. 19A, the nozzle 118 is indicated by the dashed-dotted line.

In this embodiment, in one ink chamber 112, heat-generation resistors 113a and 113b obtained by dividing the heat-generation resistor 113 into two are arranged in parallel. An arrangement direction of the heat-generation resistors 113a and 113b is the same as the arrangement direction of the nozzles 118. Typically, the two heat-generation resistors 113a and 113b are set to have the same resistance.

When a time lag in air bubble generation is caused between the heat-generation resistors 113a and 113b, an angle of discharge of the ink does not become vertical. As shown in FIGS. 20A and 20B, the discharge direction of the ink is deflected, that is, is set to be an oblique direction. FIG. 20C shows a case where the time lag is substantially zero. In this case, a droplet D of the ink is discharged in a direction (hereinafter, referred to as vertical direction) along a center line L of the heat-generation resistors 113a and 113b.

To cause the time lag in the air bubble generation, the head drive controller 56 performs control so that different currents are caused to flow into the heat-generation resistors 113a and 113b. In FIG. 20A, a current to the heat-generation resistor 113a on the left side is larger than that to the heat-generation resistor 113b on the right side. In this case, the droplet D is discharged so as to be deflected rightward from the center line L. In FIG. 20B, the current to the heat-generation resistor 113b on the right side is larger than that to the heat-generation resistor 113a on the left side. In this case, the droplet D is discharged so as to be deflected leftward from the center line L. FIG. 20C shows the state where substantially the same current is applied to the heat-generation resistors 113a and 113b, and the droplet D is discharged in the vertical direction in this case.

FIGS. 21 and 22 are diagrams showing a method of producing a lattice-shaped 3-D object in the 3-D modeling apparatus in which the inkjet head 131 is used. It should be noted that the structure of the 3-D modeling apparatus in which the inkjet head 131 is used is the same as that of the 3-D modeling apparatus 100 except the inkjet head 131. In FIGS. 21 and 22, description on the same part as in FIGS. 10 and 11 will be omitted or simplified.

Figure 21A:
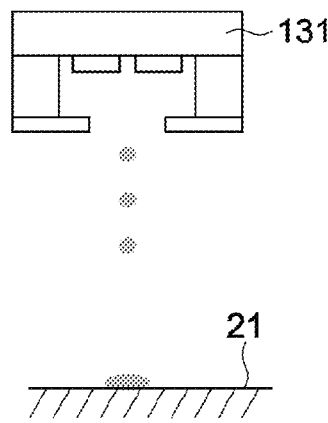
FIG. 21 are diagrams showing a method of producing a lattice-shaped 3-D object in the case where the inkjet head shown in FIG. 18 is used.
Figure 21D:
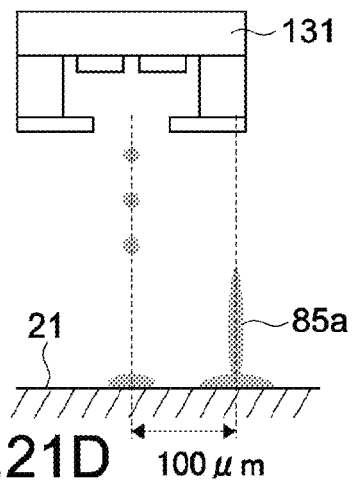
Figure 21B:
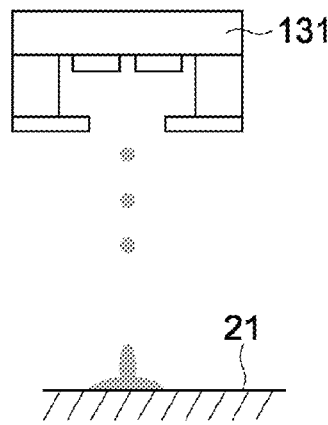
Figure 21E:
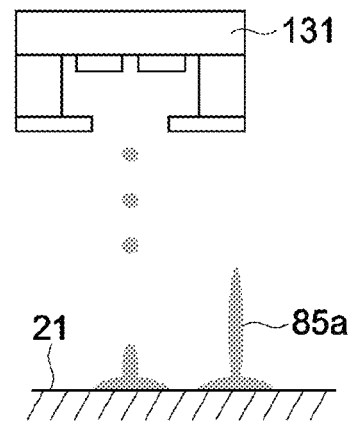
Figure 21C:
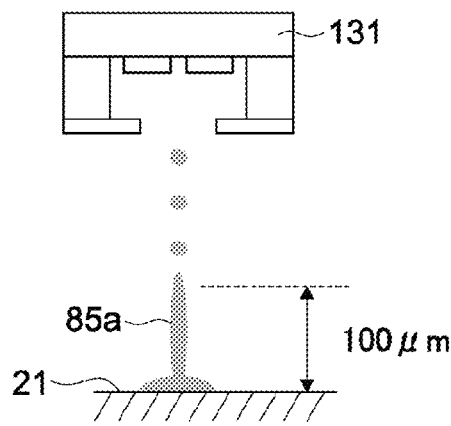
Figure 21F:
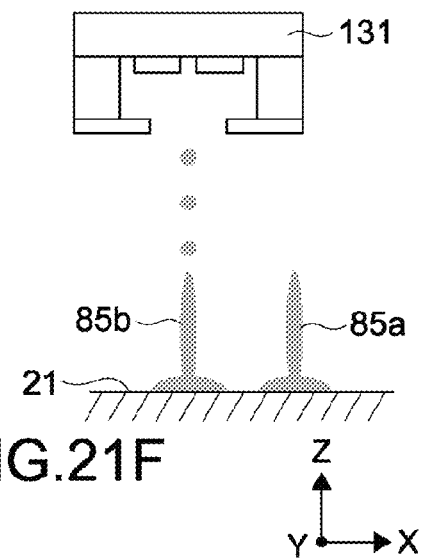

When the inkjet head 131 is positioned, as shown in FIGS. 21A to 21C, ink is discharged continuously for a predetermined time period in the vertical direction, thereby forming the rod-like body 85a that is substantially vertical. Then, as shown in FIGS. 21D to 21F, the inkjet head 131 or the modeling stage 21 is moved by approximately 100 µm in the X direction, for example, and thereafter the ink is discharged as in the operations shown in FIGS. 10A to 10C, thereby forming the rod-like body 85b.

Figure 22A:
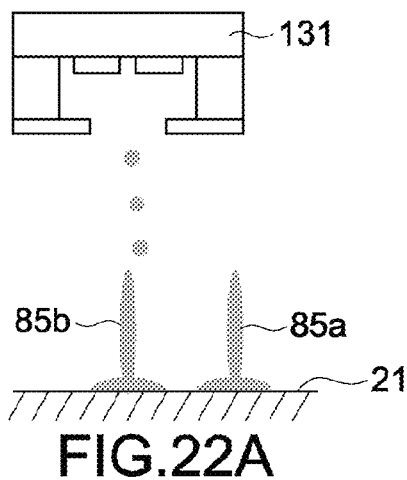
FIG. 22 are diagrams showing the continuation of the method of producing the 3-D object shown in FIG. 21.
Figure 22D:
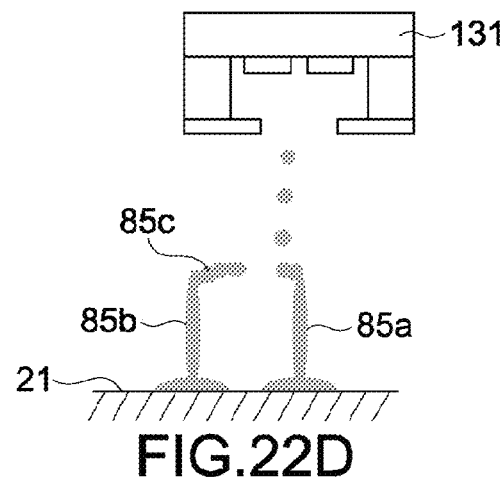
Figure 22B:
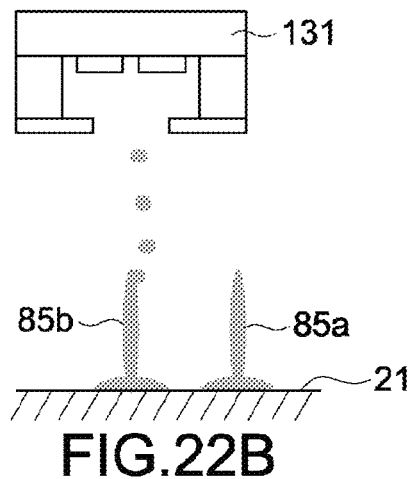
Figure 22E:
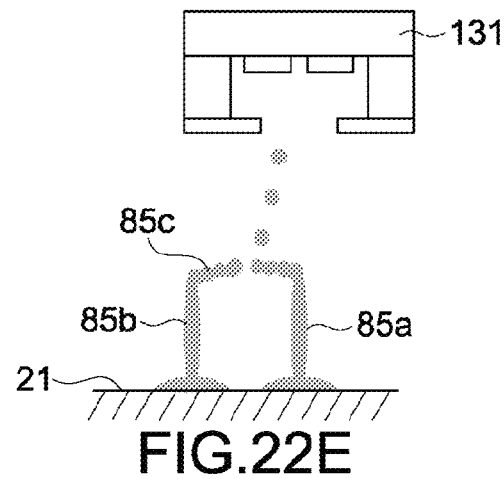
Figure 22C:
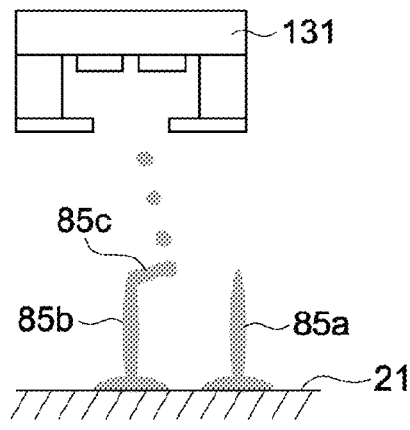

As shown in FIGS. 22A to 22C, the inkjet head 131 discharges the ink in an oblique direction so that the discharge direction is shifted toward the vertical rod-like body 85a. That is, an angle of the discharge direction is gradually increased from the vertical direction. Thus, the rod-like body 85c is formed to be extended in a non-vertical direction, e.g., in the substantially horizontal direction, from the vertical rod-like body 85a.

Figure 22F:
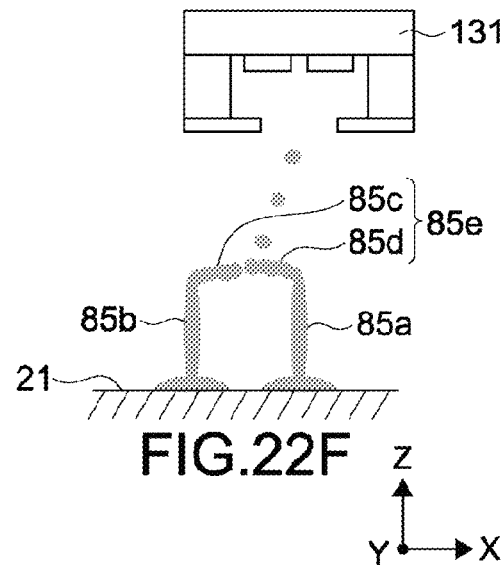

As shown in FIG. 22D, the inkjet head 131 or the modeling stage 21 is moved so that the center line L (see, FIG. 20) of the inkjet head 131 is an extension of the vertical rod-like body 85a. Further, as shown in FIGS. 22D to 22F, the inkjet head 131 discharges the ink in the oblique direction so as to gradually shift the discharge direction toward the vertical rod-like body 85b. That is, an angle of the discharge direction is gradually increased from the vertical direction. As a result, the rod-like body 85d is formed to be extended from the vertical rod-like body 85a in a substantially horizontal direction, for example, and is combined with the horizontal rod-like body 85c. Thus, the horizontal rod-like body 85e that connects the two vertical rod-like bodies 85a and 85b is formed.

As described above, by controlling the discharge (squirt) direction, the object can be grown in the horizontal or oblique direction without finely moving the modeling stage 21. As a result, advantages such as reduction in modeling time period and simplification of the method of controlling the modeling stage 21 can be obtained.

The present invention is not limited to the above embodiments, and various other embodiments are conceivable.

The inkjet head 31 according to this embodiment is moved in the X direction by the X-direction movement unit 32, but may be moved on the X-Y plane. Alternatively, the inkjet head 31 may also be moved in the Z direction. Further, the modeling stage 21 may be moved on the X-Y plane with the inkjet head 31 being fixed in position.

In FIGS. 11A to 11F and FIGS. 22A to 22F, the horizontal rod-like bodies 85e are formed in twice from the two vertical rod-like bodies. However, the horizontal rod-like body 85e may be formed in one from one vertical rod-like body. Such an embodiment can be implemented by adjusting the lattice pitch or the viscosity or the like of the ink.

In the above embodiments, the pitches of the lattice of the 3-D object in the horizontal direction and the vertical direction are set to be substantially the same, but may be different.

In the above embodiments, the lattice pitch (for example, approximately 100 µm) of the 3-D object is coincided with the one-layer pitch of the 3-D object in the Z direction. However, the lattice pitch may be greater or less than that of the one-layer pitch thereof in the Z direction.

In the above embodiments, the 3-D object is formed based on the two-dimensional (2-D) tomographic image data, but may be formed based on 3-D data of a modeling target object.

In the 3-D modeling apparatus 100 according to the above embodiments, a heater that heats the 3-D object formed on the modeling stage 21 on the downstream side (right side of the head unit in FIG. 4) of the head unit.

In the above embodiments, the example is given in which the lattice-shaped 3-D object is formed. However, the 3-D object is not limited to have the lattice shape, or may be a porous 3-D object. The porous body herein refers to an object whose hole's 3-D shape is not limited, for example, an object whose lattice pitch is random. Alternatively, the 3-D modeling apparatus 100 can form not only the lattice-shaped or porous 3-D object but also a normal 3-D object having no hole.

The present application contains subject matter related to that disclosed in Japanese Priority Patent Application JP 2009-202406 filed in the Japan Patent Office on Sep. 2, 2009, the entire content of which is hereby incorporated by reference.

What is claimed is:

1. A three-dimensional modeling apparatus, comprising:
 a stage;
 a head unit including an inkjet head containing at least one process liquid that is one of a solution and a dispersion liquid that is deposited onto the stage to cause a material that constitutes a three-dimensional object to be precipitated out of the process liquid by evaporating one of a solvent and a dispersion medium therefrom;
 a movement mechanism configured to relatively move the head unit and the stage by means of at least one drive;
 a print base plate having first and second openings, the inkjet head being movable over the first opening, the process liquid being deposited onto the stage via the first opening, and the second opening being structured such that the three-dimensional object is enabled to pass through the second opening; and a controller operatively connected to each drive of the movement mechanism to form the three-dimensional object, wherein, the stage is movable under the print base plate, the stage being enabled to move to at least positions corresponding to the first and second openings of the print base plate, and the apparatus forms the three-dimensional object solely using the process liquid deposited by inkjet head of the head unit.

2. The three-dimensional modeling apparatus according to claim 1, wherein under the control of the controller, the apparatus is capable of forming at least two vertical rod-like bodies with the material and forms a non-vertical rod-like body with the material, the non-vertical rod-like body connecting the two vertical rod-like bodies.

3. The three-dimensional modeling apparatus according to claim 1, wherein the three-dimensional object is a lattice-shaped object.

4. The three-dimensional modeling apparatus according to claim 1, wherein the three-dimensional object is a scaffolding member for regeneration of a body tissue.

5. The three-dimensional modeling apparatus according to claim 3, wherein the three-dimensional object is a scaffolding member for regeneration of a body tissue.

6. The three-dimensional modeling apparatus according to claim 2, wherein the controller forms the non-vertical rod-like body by moving the head unit and the stage relatively in a non-vertical direction.

7. The three-dimensional modeling apparatus according to claim 2, wherein the head unit is capable of discharging the process liquid in an oblique direction.

8. The three-dimensional modeling apparatus according to claim 1, wherein the controller is configured to control movement of the movement mechanism based on two-dimensional image data that is a tomographic image of a modeling target object.

9. A three-dimensional modeling apparatus, comprising:

a stage on which a three-dimensional object can be formed;

a head unit including an inkjet head containing at least one process liquid that is one of a solution and a dispersion liquid;

a movement mechanism configured to move the head unit and the stage relative to each other in three orthogonal directions;

a print base plate having first and second openings, the inkjet head being movable over the first opening, the process liquid being deposited onto the stage via the first opening, and the second opening being structured such that the three-dimensional object is enabled to pass through the second opening; and a controller operatively connected to the head unit and one or more drives of the movement mechanism to cause the head unit to deposit process liquid onto the stage in accordance with data defining a shape of the three-dimensional object, wherein, the stage is movable under the print base plate, the stage being enabled to move to at least positions corresponding to the first and second openings of the print base plate, and the apparatus forms the three-dimensional object solely by causing a material that constitutes the three-dimensional object to be precipitated out of the process liquid by evaporating one of a solvent and a dispersion medium therefrom.

10. The three-dimensional modeling apparatus of claim 9, wherein the movement mechanism comprises a first drive to move the stage along a first horizontal axis, a second drive to move the stage along a vertical axis and a third drive to move the head unit along a second horizontal axis perpendicular to the first horizontal axis.

11. The three-dimensional modeling apparatus of claim 9, wherein the head unit comprises a plurality of inkjet heads which contain at least two different process liquids.

12. The three-dimensional modeling apparatus of claim 11, wherein the different process liquids differ in color.

13. The three-dimensional modeling apparatus of claim 10, wherein the controller comprises:

a host computer and memory configured to receive image data;

a movement controller configured to drive the first drive;

a lifting and lowering controller configured to drive the second drive; and a head unit drive controller configured to drive the third drive, wherein, the head unit drive controller, the lifting and lowering controller and the movement controller are operatively connected to and controlled by the host computer.

14. The three-dimensional modeling apparatus of claim 1, further comprising:

a base plate with guide rails;

wherein, the stage is configured to move along the guide rails to at least positions corresponding to the first and second openings of the print base plate.

15. The three-dimensional modeling apparatus of claim 1, wherein:

the first opening is longer along a first direction than the second opening, and the stage is configured to move along a second direction, the second direction being perpendicular to the first direction.

16. The three-dimensional modeling apparatus of claim 1, wherein:

the head unit is configured to continuously discharge the process liquid while the stage is moving.

17. The three-dimensional modeling apparatus of claim 9, wherein:

the first opening is longer along a first direction than the second opening, and the stage is configured to move along a second direction, the second direction being perpendicular to the first direction.

18. The three-dimensional modeling apparatus of claim 9, wherein:

the head unit is configured to continuously discharge the process liquid while the stage is moving.

* * * * *